(12) United States Patent
Kim et al.

(10) Patent No.: US 12,177,026 B2
(45) Date of Patent: Dec. 24, 2024

(54) ENCODING SCHEME FOR HARQ OPERATION

(71) Applicant: LG ELECTRONICS INC., Seoul (KR)

(72) Inventors: Jinmin Kim, Seoul (KR); Jinsoo Choi, Seoul (KR); Dongguk Lim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 17/626,273

(22) PCT Filed: Jul. 1, 2020

(86) PCT No.: PCT/KR2020/008604
§ 371 (c)(1),
(2) Date: Jan. 11, 2022

(87) PCT Pub. No.: WO2021/010623
PCT Pub. Date: Jan. 21, 2021

(65) Prior Publication Data
US 2022/0278778 A1    Sep. 1, 2022

(30) Foreign Application Priority Data
Jul. 12, 2019 (KR) .................. 10-2019-0084771

(51) Int. Cl.
*H04L 1/1812* (2023.01)
*H04L 1/00* (2006.01)
*H04W 84/12* (2009.01)

(52) U.S. Cl.
CPC .......... *H04L 1/1819* (2013.01); *H04L 1/0068* (2013.01); *H04W 84/12* (2013.01)

(58) Field of Classification Search
CPC ... H04L 1/1819; H04L 1/0068; H04L 1/0013; H04L 1/1816; H04W 84/12
See application file for complete search history.

(56) References Cited

U.S. PATENT DOCUMENTS

| 10,348,329 | B2 | 7/2019 | Soriaga et al. |
| 2005/0180525 | A1* | 8/2005 | Hansen ................ H04L 1/0065 |
| | | | 375/295 |

(Continued)

FOREIGN PATENT DOCUMENTS

| CN | 111901065 A | * 11/2020 | ........ H03M 13/1105 |
| KR | 1020020031094 | 4/2002 | |

(Continued)

OTHER PUBLICATIONS

Zhang, Yan et al., Comparisons of HARQ transmission schemes for 11be, Doc.: IEEE 802.11 19/0792 r1. May 12, 2019, see slide 4.

(Continued)

*Primary Examiner* — Chi H Pham
*Assistant Examiner* — Samuel Dilan Rutnam
(74) *Attorney, Agent, or Firm* — BRYAN CAVE LEIGHTON PAISNER LLP

(57) ABSTRACT

A transmission station (STA) of a wireless local area network system according to various embodiments can determine a first code rate and encode first data on the basis of a second code rate which is lower than the first code rate. The transmission STA can again generate second data on the basis of the first code rate and the encoded first data and transmit same.

11 Claims, 35 Drawing Sheets

(56) References Cited

U.S. PATENT DOCUMENTS

2014/0205029 A1* 7/2014 Srinivasa .............. H04L 1/0016
375/260
2019/0215105 A1 7/2019 Xu et al.

FOREIGN PATENT DOCUMENTS

KR 10-0433891 B1 * 6/2004 .............. H04L 1/12
KR 1020080109422 12/2008

OTHER PUBLICATIONS

Kim, Jinmin et al., Channel coding issue in HARQ doc.: IEEE 802.11-19/1132r0., Jul. 14, 2019, see slide 6.

* cited by examiner

FIG. 1
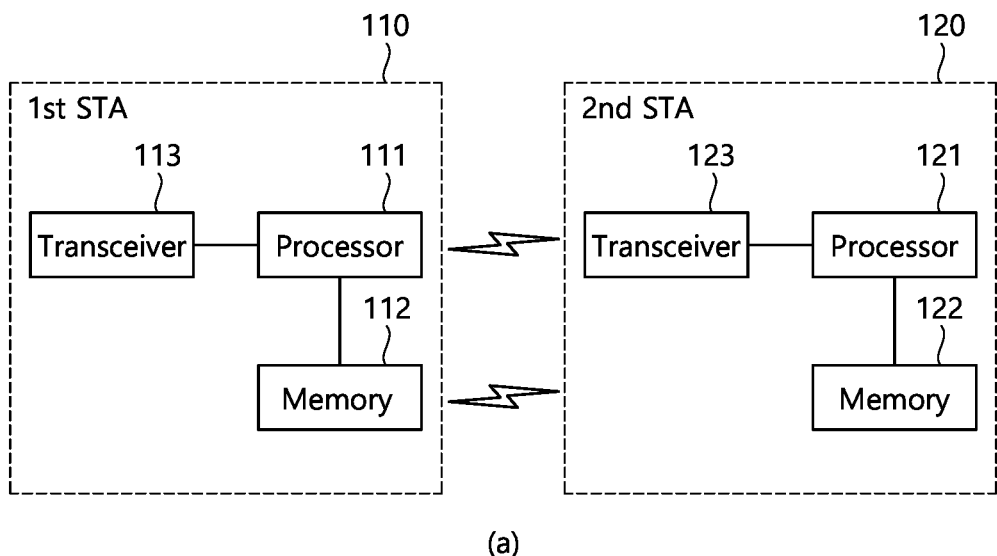
(a)
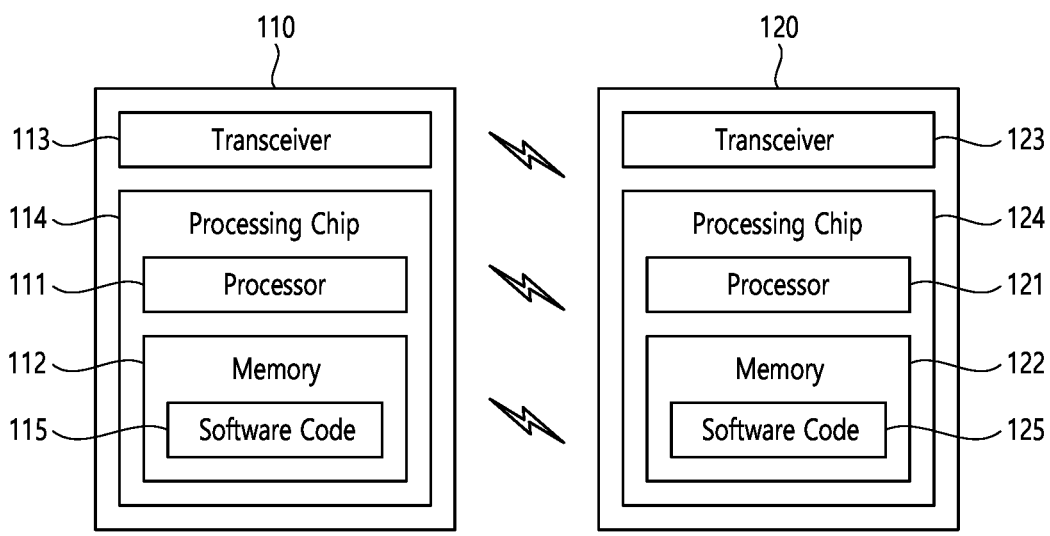
(b)

FIG. 2
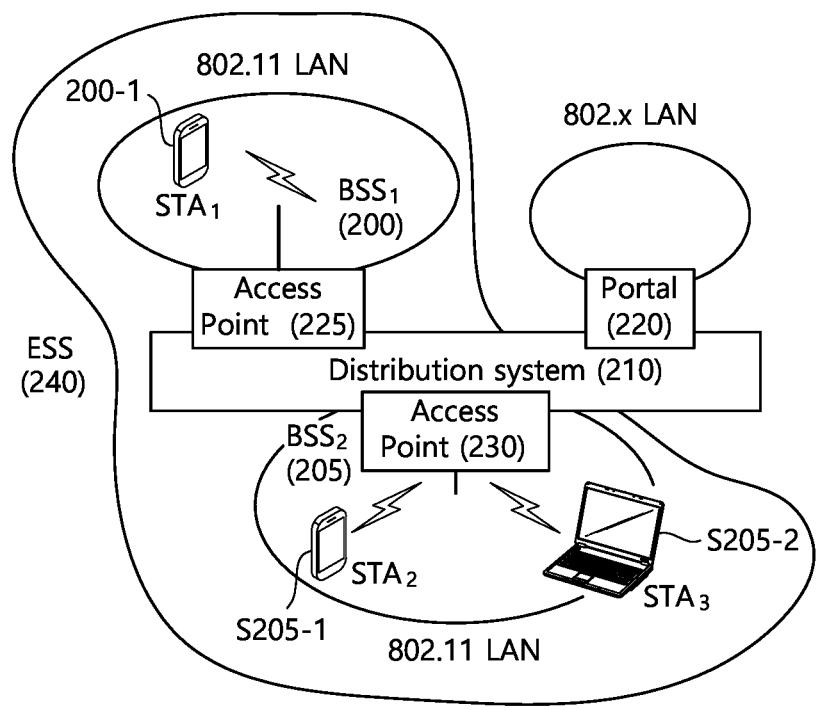
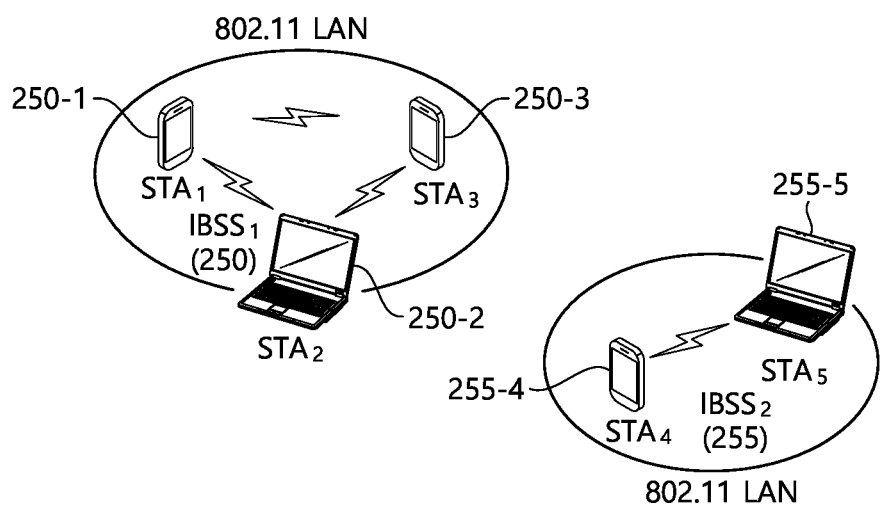

FIG. 4
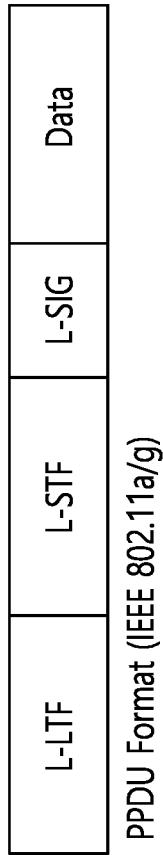
PPDU Format (IEEE 802.11a/g)
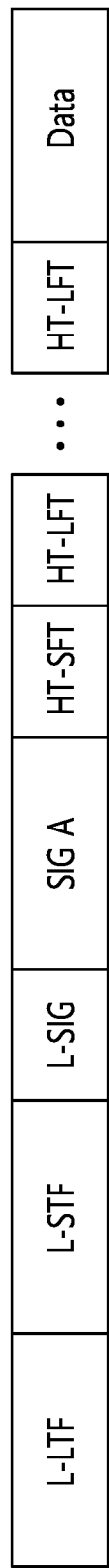
HT PPDU Format (IEEE 802.11n)
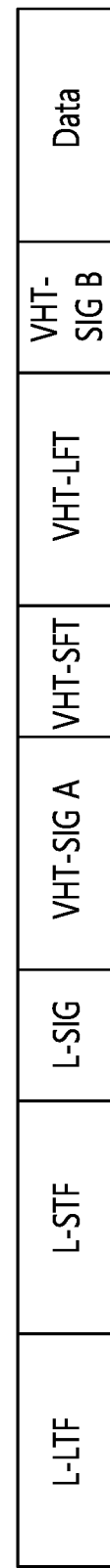
VHT PPDU Format (IEEE 802.11ac)
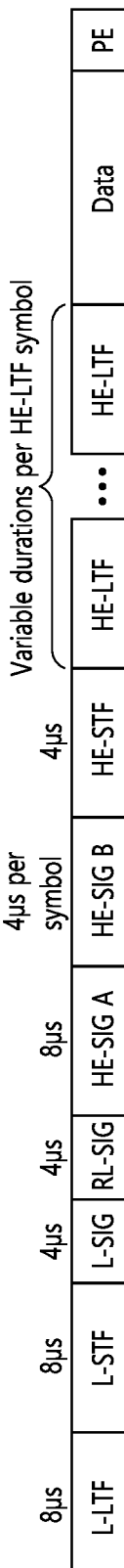

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

FIG. 30

$$P_0 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

FIG. 31

$$P_1 = \begin{bmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \end{bmatrix}$$

FIG. 32

$$P_5 = \begin{bmatrix} 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \end{bmatrix}$$

FIG. 33

```
Coding rate R=1/2
 0  -  -  -  0  0  -  -  0  -  -  0  1  0  -  -  -  -  -  -  -  -  -  -
22  0  -  - 17  -  0  0 12  -  -  -  0  0  -  -  -  -  -  -  -  -  -  -
 6  -  0  - 10  -  -  - 24  -  0  -  -  -  0  0  -  -  -  -  -  -  -  -
 2  -  -  0 20  -  -  - 25  0  -  -  -  -  -  0  0  -  -  -  -  -  -  -
23  -  -  -  3  -  -  -  0  -  9 11  -  -  -  -  0  0  -  -  -  -  -  -
24  - 23  1 17  -  3  - 10  -  -  -  -  -  -  -  -  0  0  -  -  -  -  -
25  -  -  -  8  -  -  -  7 18  -  -  0  -  -  -  -  -  0  0  -  -  -  -
13 24  -  -  0  -  8  -  6  -  -  -  -  -  -  -  -  -  -  0  0  -  -  -
 7 20  - 16 22 10  -  - 23  -  -  -  -  -  -  -  -  -  -  -  0  0  -  -
11  -  -  - 19  -  -  - 13  -  3 17  -  -  -  -  -  -  -  -  -  0  0  -
25  -  8  - 23 18  - 14  9  -  -  -  -  -  -  -  -  -  -  -  -  -  0  0
 3  -  -  - 16  -  -  2 25  5  -  -  1  -  -  -  -  -  -  -  -  -  -  0

Coding rate R=2/3
25 26 14  - 20  -  2  -  4  -  -  8  - 16  - 18  1  0  -  -  -  -  -  -
10  9 15 11  -  0  -  1  -  - 18  -  8  - 10  -  -  0  0  -  -  -  -  -
16  2 20 26 21  -  6  -  1 26  -  7  -  -  -  -  -  -  0  0  -  -  -  -
10 13  5  0  -  3  -  7  -  - 26  -  - 13  - 16  -  -  -  0  0  -  -  -
23 14 24  - 12  - 19  - 17  -  -  - 20  - 21  -  0  -  -  -  0  0  -  -
 6 22  9 20  - 25  - 17  -  8  - 14  - 18  -  -  -  -  -  -  -  0  0  -
14 23 21 11 20  - 24  - 18  - 19  -  -  -  - 22  -  -  -  -  -  -  0  0
17 11 11 20  - 21  - 26  -  3  -  -  - 18  - 26  -  1  -  -  -  -  -  0

Coding rate R=3/4
16 17 22 24  9  3 14  -  4  2  7  - 26  -  2  - 21  -  1  0  -  -  -  -
25 12 12  3  3 26  6 21  - 15 22  - 15  -  4  -  - 16  -  0  0  -  -  -
25 18 26 16 22 23  9  -  0  -  4  -  4  -  8 23 11  -  -  -  0  0  -  -
 9  7  0  1 17  -  -  7  3  -  3 23  - 16  -  - 21  -  0  -  -  0  0  -
24  5 26  7  1  -  - 15 24 15  -  8  - 13  - 13  - 11  -  -  -  -  0  0
 2  2 19 14 24  1 15 19  - 21  -  2  - 24  -  3  -  2  1  -  -  -  -  0

Coding rate R=5/6
17 13  8 21  9  3 18 12 10  0  4 15 19  2  5 10 26 19 13 13  1  0  -  -
 3 12 11 14 11 25  5 18  0  9  2 26 26 10 24  7 14 20  4  2  -  0  0  -
22 16  4  3 10 21 12  5 21 14 19  5  -  8  5 18 11  5  5 15  0  -  0  0
 7  7 14 14  4 16 16 24 24 10  1  7 15  6 10 26  8 18 21 14  1  -  -  0
```

ENCODING SCHEME FOR HARQ OPERATION

This application is the National Stage filing under 35 U.S.C. 371 of International Application No. PCT/KR2020/008604 filed on Jul. 1, 2020, which claims priority to Korean Patent Application No. 10-2019-0084771 filed on Jul. 12, 2019, the contents of which are all hereby incorporated by reference herein in their entirety.

BACKGROUND

Technical Field

The present specification relates to an encoding scheme for performing a hybrid automatic repeat request (HARQ) operation in a wireless local area network (WLAN) system.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

The present disclosure proposes technical features that improve the legacy WLAN or that may be utilized in a new communication standard. For example, the new communication standard may be an extreme high throughput (EHT) standard which has lately been under discussion. The EHT standard may use a newly proposed increased bandwidth, an improved physical (PHY) protocol data unit (PPDU) structure, an improved sequence, a hybrid automatic repeat request (HARQ) technique, and a multi-link technique.

SUMMARY

Technical Objects

The EHT standard can use the HARQ scheme that checks whether the received data has no errors and requires retransmission when an error occurs. In order to use the HARQ scheme, a receiving STA supporting HARQ may attempt error correction on received data and determine whether to retransmit using an error detection code.

The transmitting STA may encode the data for transmission. An encoding method for HARQ operation may be required. Specifically, when the HARQ IR operation is performed, the transmitting STA may require a different encoding method for initial transmission and retransmission.

Technical Solutions

A transmitting station (STA) in a wireless local area network (WLAN) system according to various embodiments may determine a first code rate and may encode a first data based on a second code rate lower than the first code rate. The transmitting STA may generate the second data based on the first code rate and the encoded first data, and may transmit the second data.

Technical Effects

According to some embodiments of the present specification, in order to support HARQ IR, the transmitting STA may apply a new encoding scheme. According to some embodiments of the present specification, when HARQ IR is supported, a parity check matrix defined in the prior art may be used. Accordingly, there is the effect of supporting HARQ IR only by changing some processes and parameters during the encoding process.

According to some embodiments of the present specification, performance can be improved by encoding, in advance, using a code rate lower than the code rate of a packet (or data) to be transmitted.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 18 illustrates an example of a PPDU used in the present specification.

FIGS. 30 to 32 show examples of sub-blocks constituting a parity check matrix.

FIG. 33 is a diagram for explaining an example of a parity check matrix.

DETAILED DESCRIPTION

Figure 3:
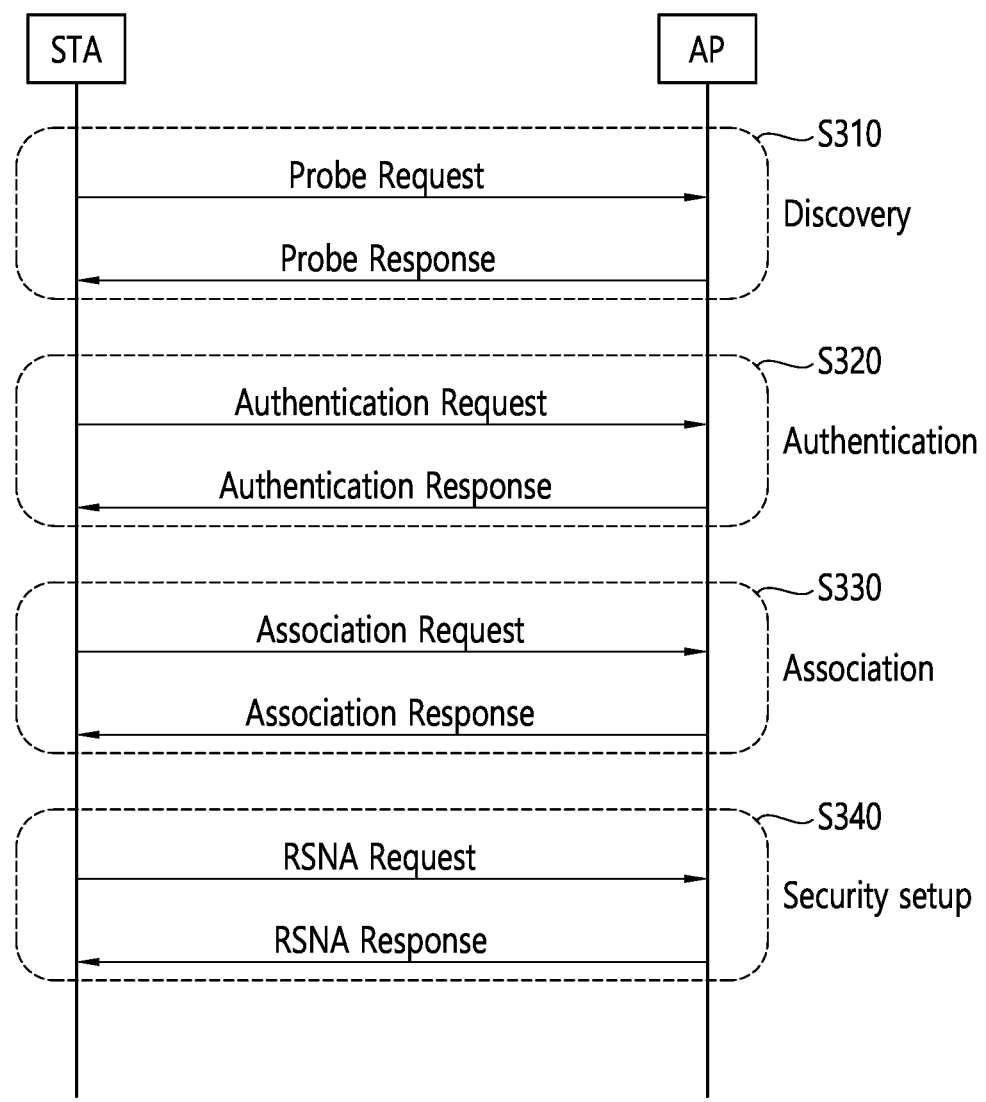
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e. EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
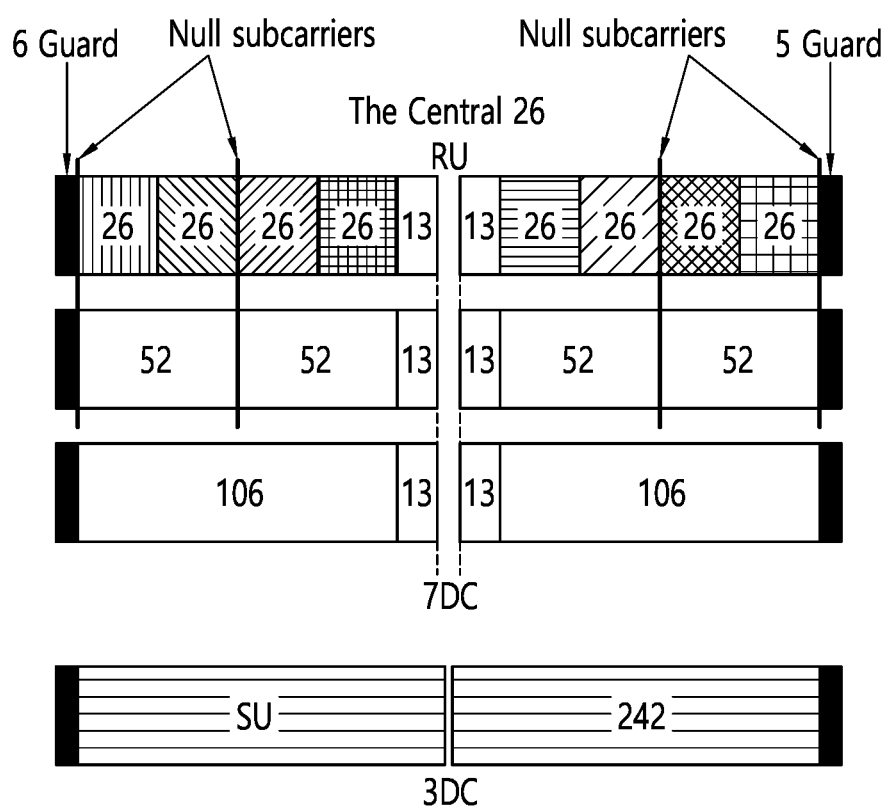
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
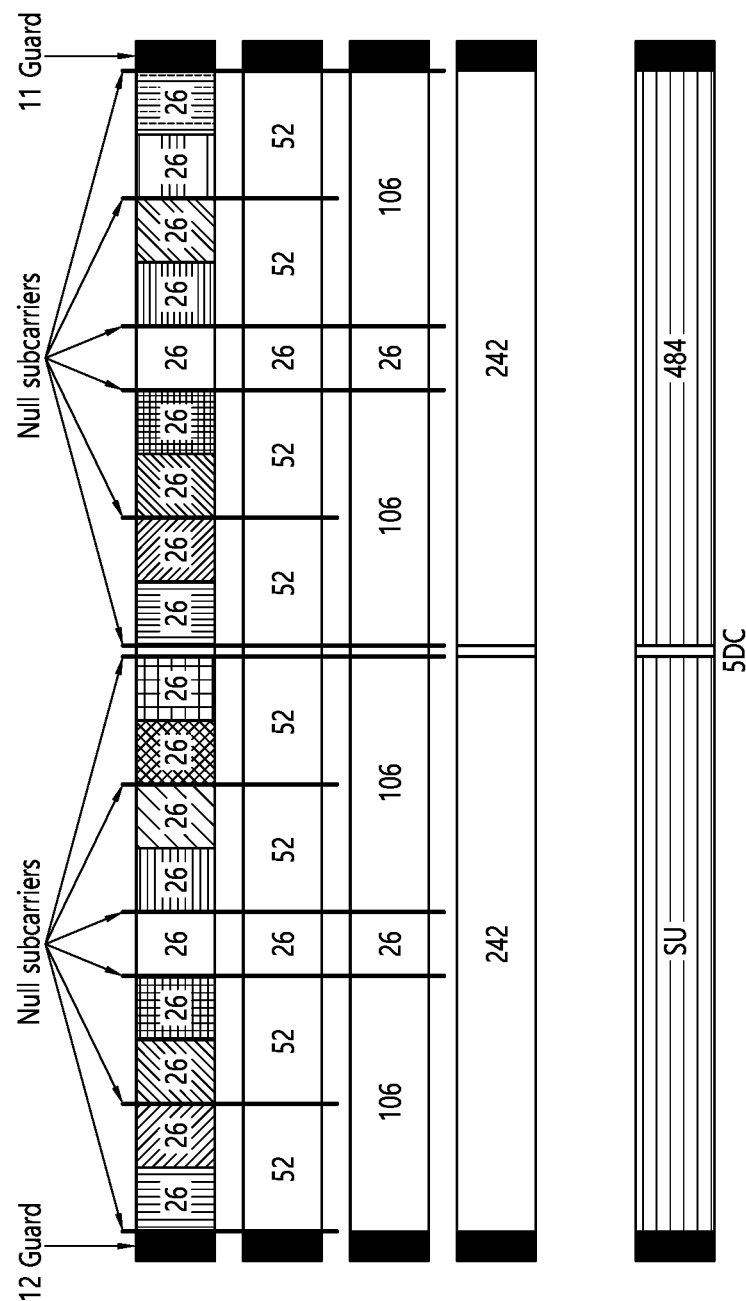
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
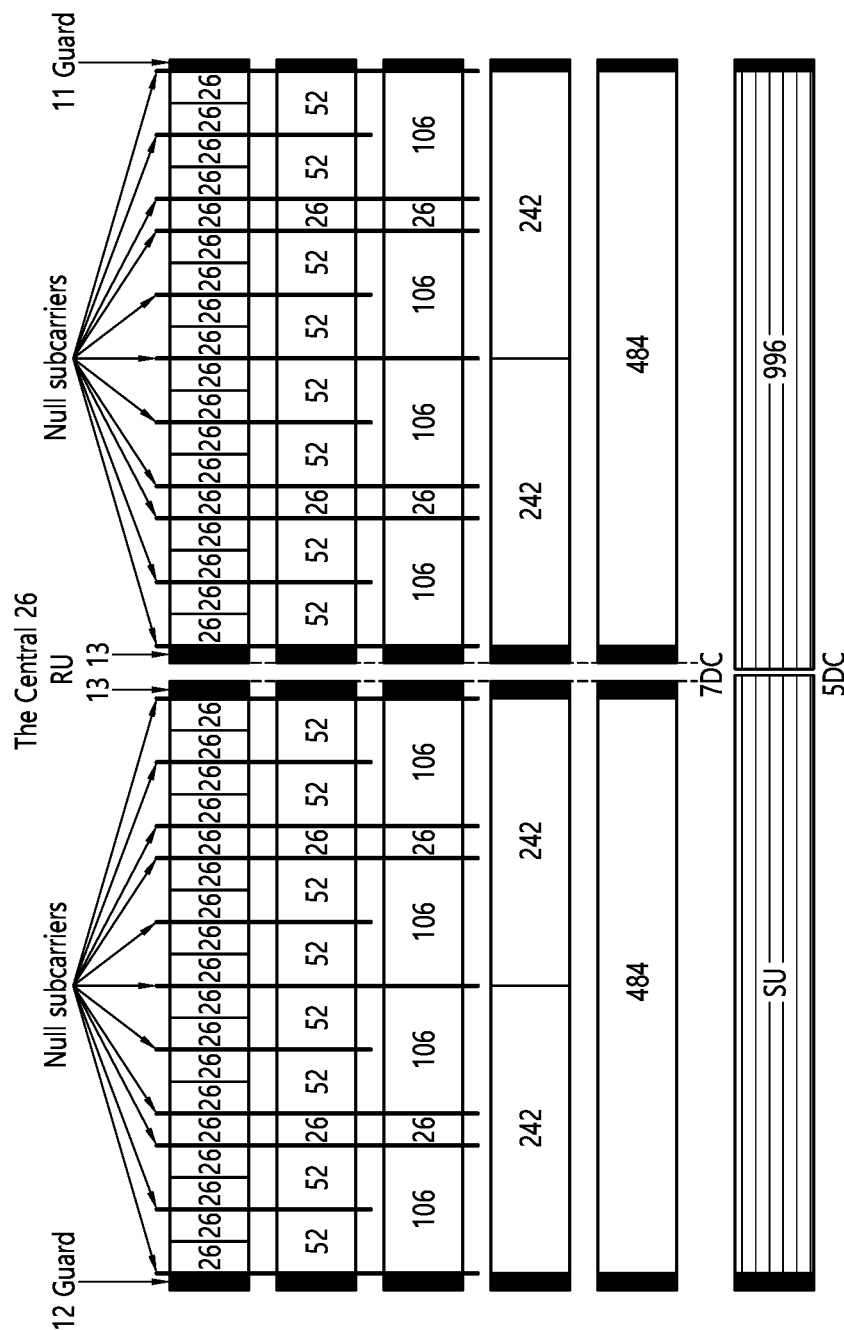
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
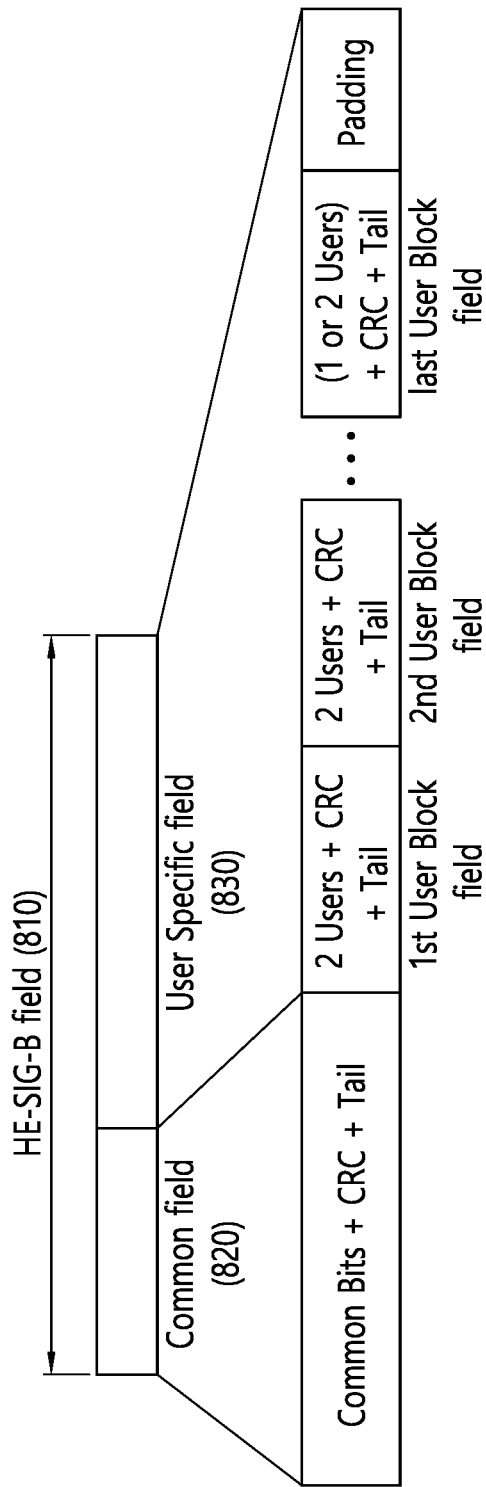
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 25 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000y$_2$y$_1$y$_0$ | | 106 | | | 26 | 26 | 26 | 26 | 26 | 8 |
| 01001y$_2$y$_1$y$_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
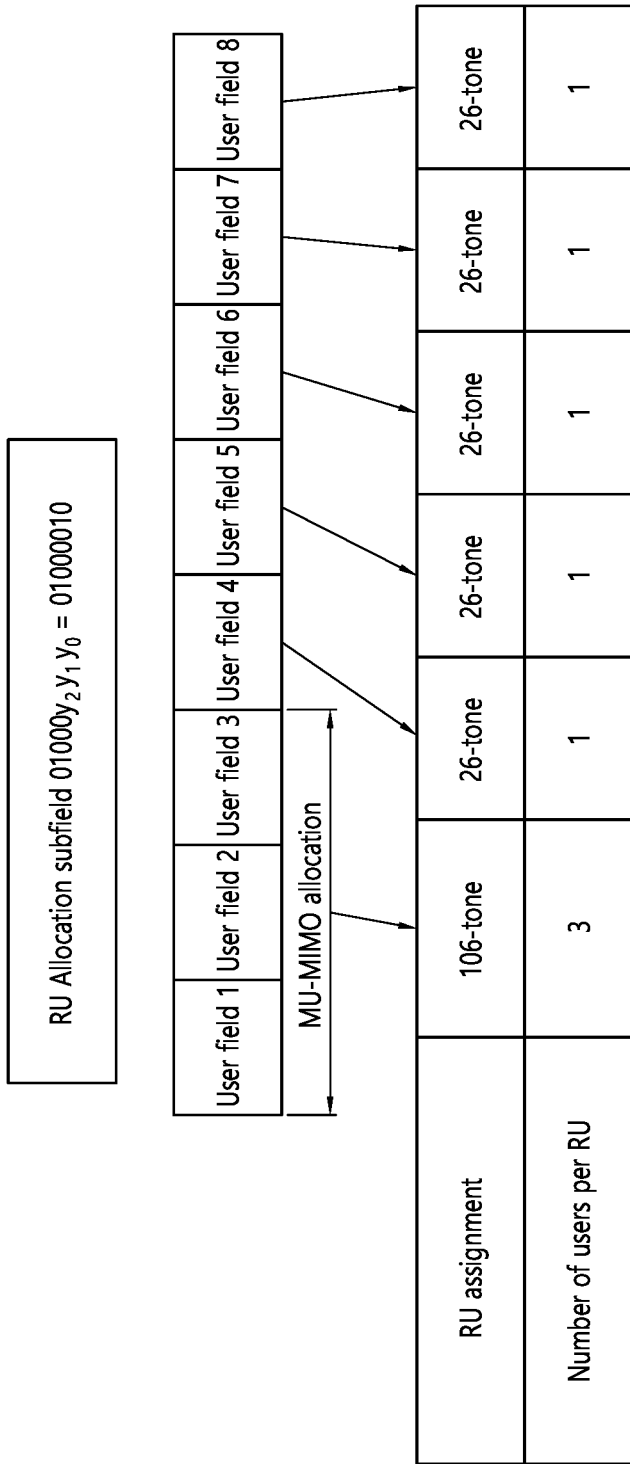
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS)

information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
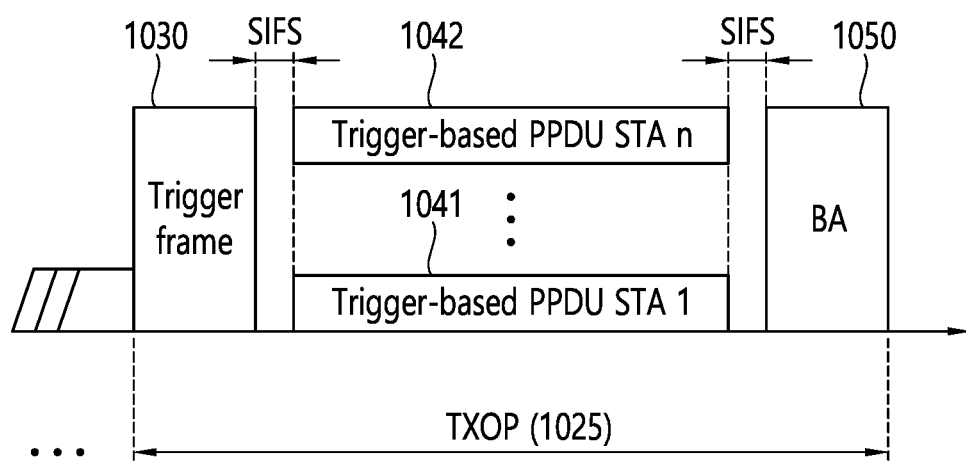
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
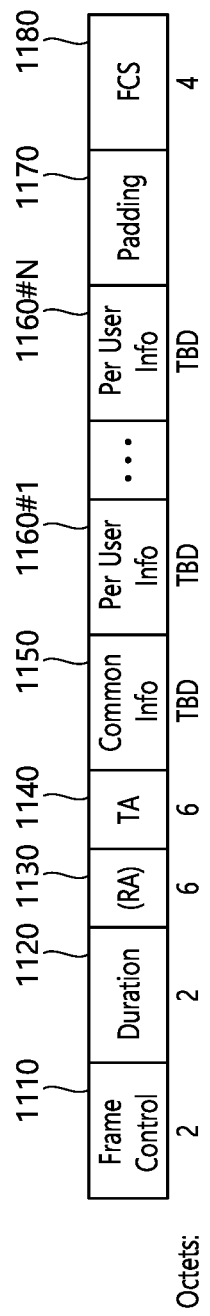
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
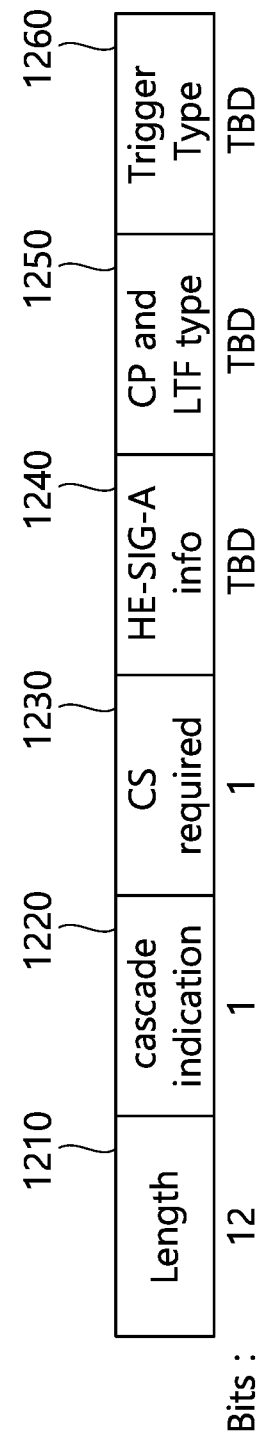
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
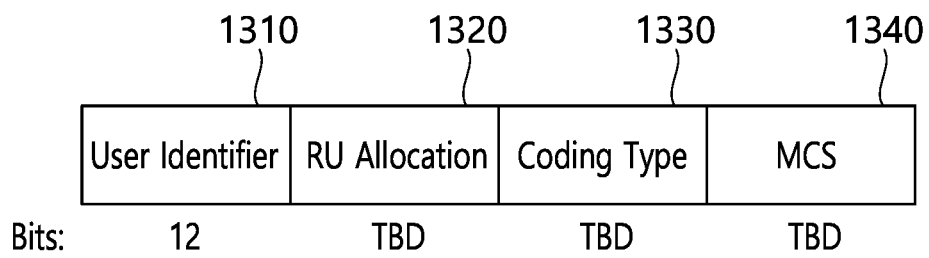
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
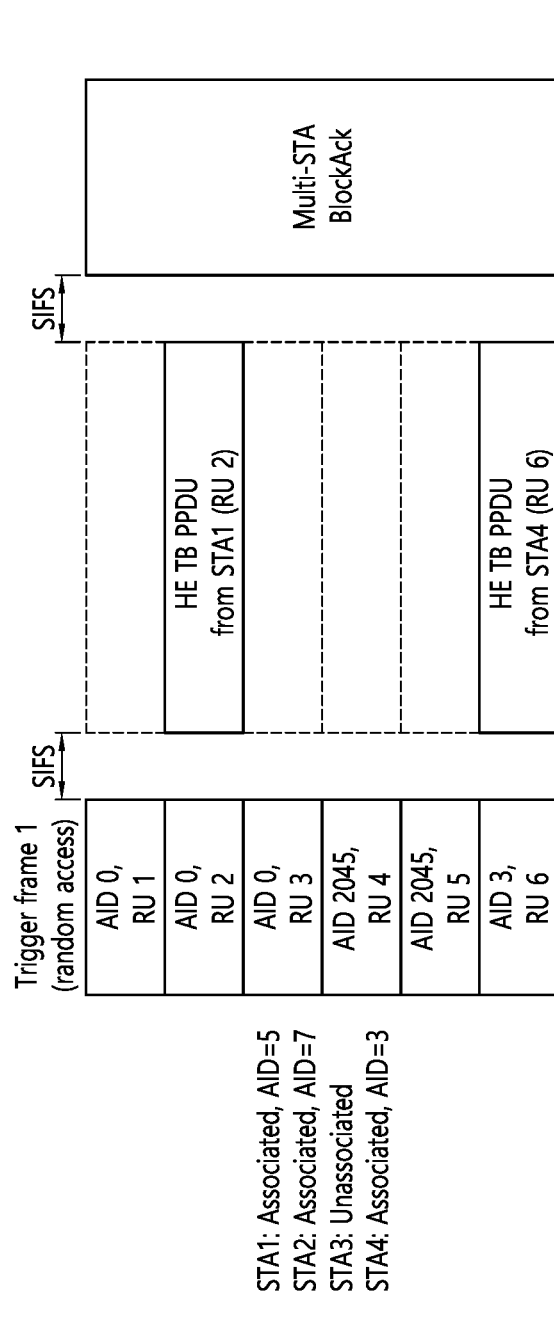
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
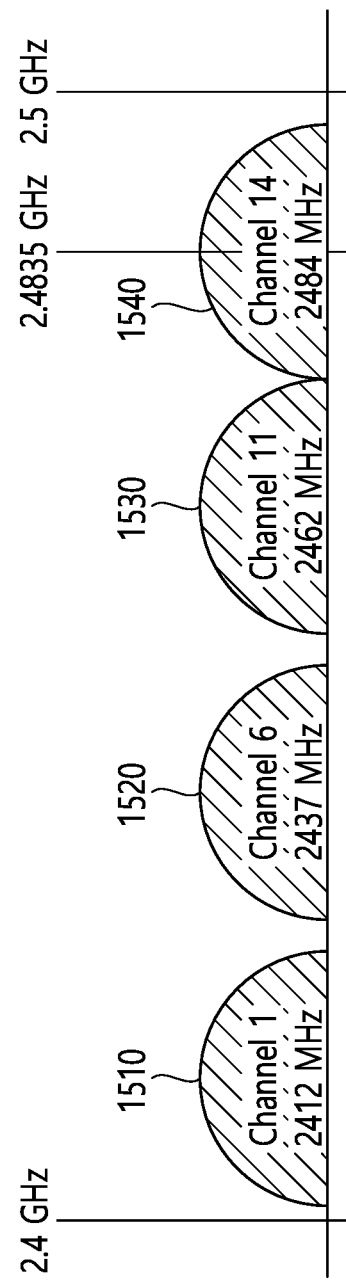
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
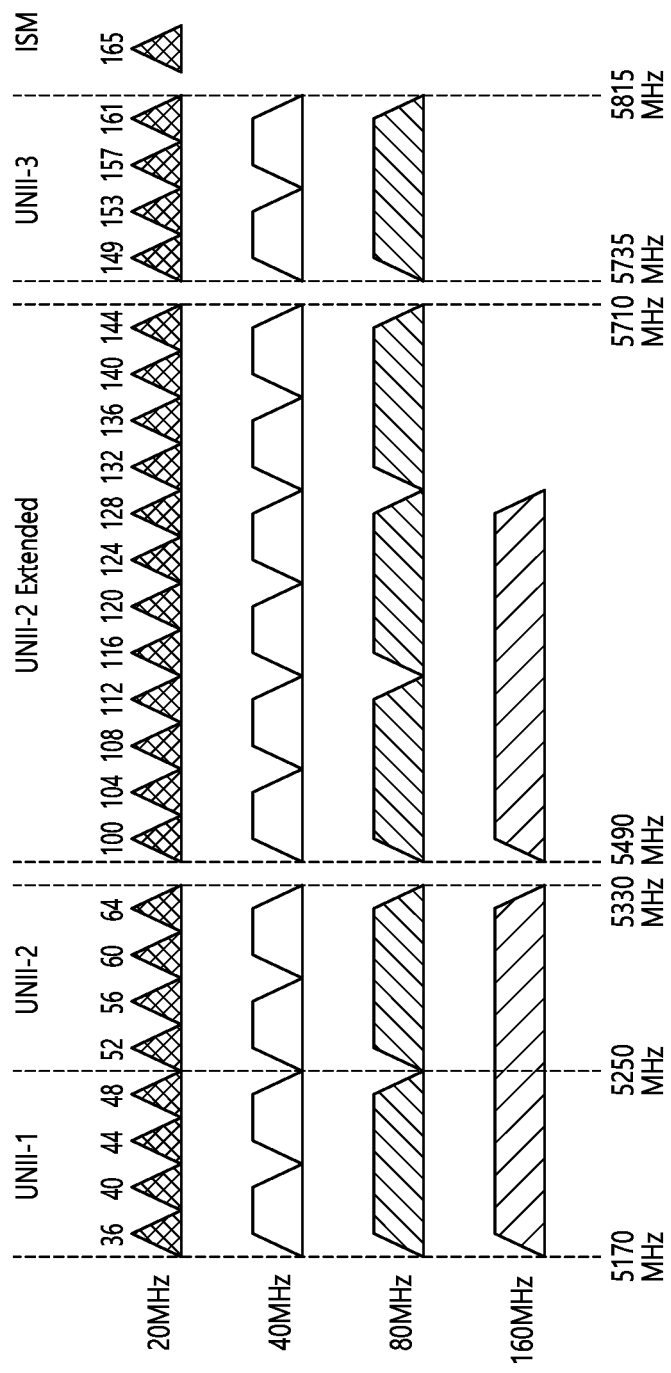
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
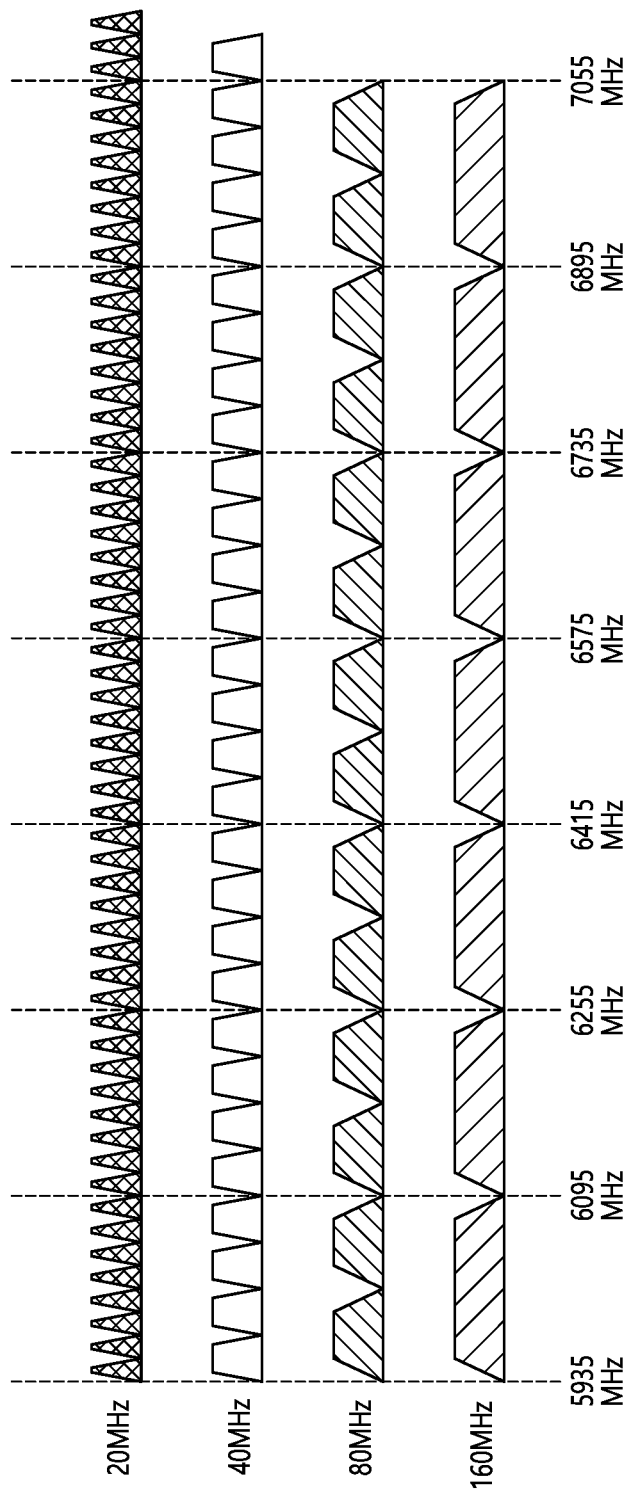
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, an STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG.

BPSK modulation may be applied to the RL-SIG. The receiving STA may figure out that the RX PPDU is the HE PPDU or the EHT PPDU, based on the presence of the RL-SIG.

After RL-SIG of FIG. 18, for example, an EHT-SIG-A or one control symbol may be inserted. A symbol located after the RL-SIG (i.e., the EHT-SIG-A or one control symbol in the present specification) may be referred as various names, such as a U-SIG (Universal SIG) field.

A symbol consecutive to the RL-SIG (e.g., U-SIG) may include information of N bits, and may include information for identifying the type of the EHT PPDU. For example, the U-SIG may be configured based on two symbols (e.g., two consecutive OFDM symbols). Each symbol (e.g., OFDM symbol) for U-SIG may have a duration of 4 μs. Each symbol of the U-SIG may be used to transmit 26-bit information. For example, each symbol of the U-SIG may be transmitted/received based on 52 data tones and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is classified into various types (e.g., EHT PPDU supporting SU, EHT PPDU supporting MU, EHT PPDU related to Trigger Frame, EHT PPDU related to Extended Range transmission, etc.), information related to the type of the EHT PPDU may be included in version-independent bits or version-dependent bits of the U-SIG.

For example, the U-SIG field includes 1) a bandwidth field including information related to a bandwidth, 2) a field including information related an MCS scheme applied to the SIG-B, 3) a dual subcarrier modulation in the SIG-B (i.e., an indication field including information related to whether the dual subcarrier modulation) is applied, 4) a field including information related to the number of symbols used for the SIG-B, 5) a field including information related to whether the SIG-B is generated over the entire band, 6) a field including information related to a type of the LTF/STF, and/or 7) information related to a field indicating a length of the LTF and the CP.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 µs, and a periodicity signal of 3.2 µs may be repeated 5 times to become a second type STF having a length of 16 µs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 µs. In addition, Guard Intervals (GIs) with various lengths (e.g., 0.8/1/6/3.2 µs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
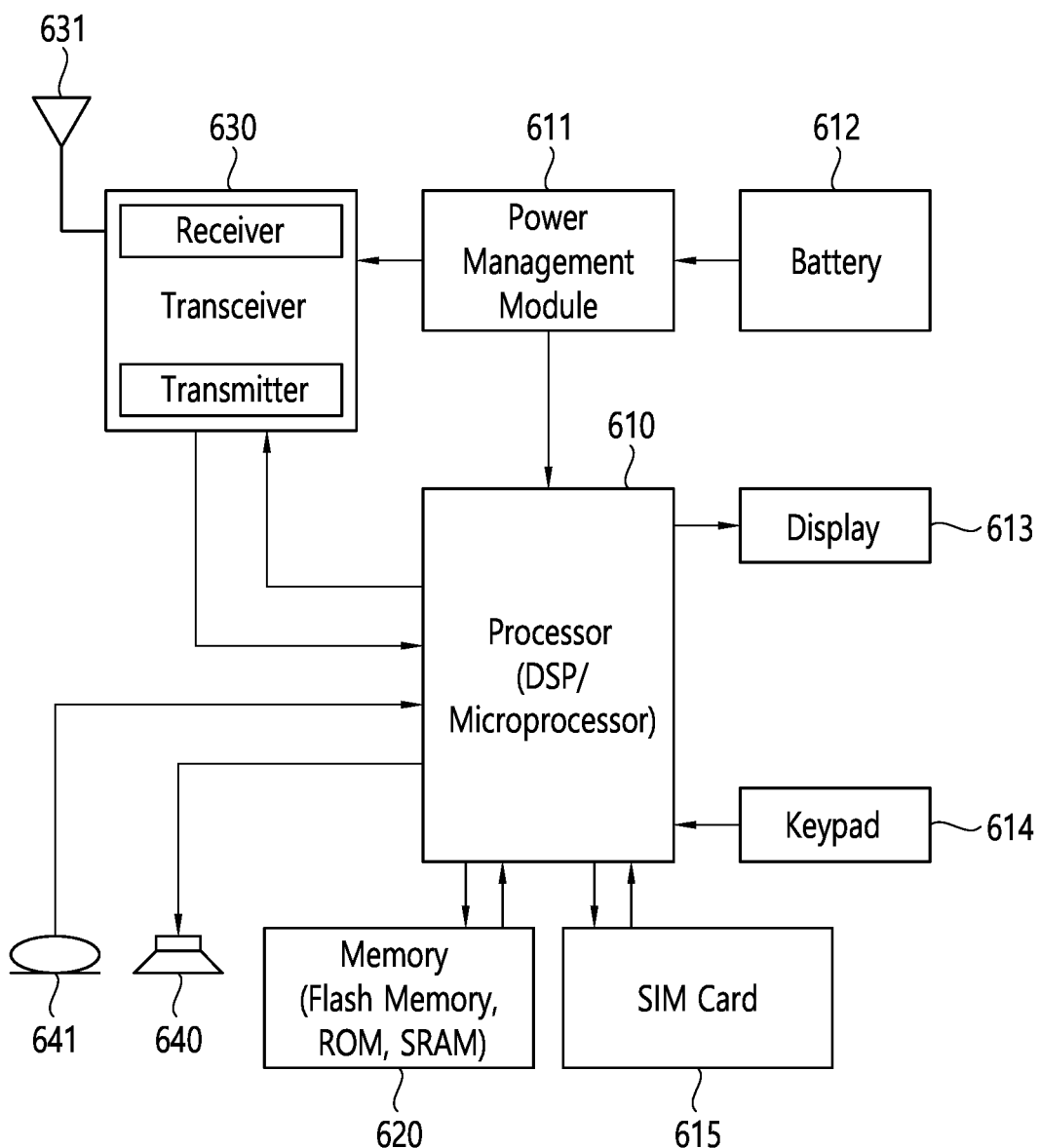
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
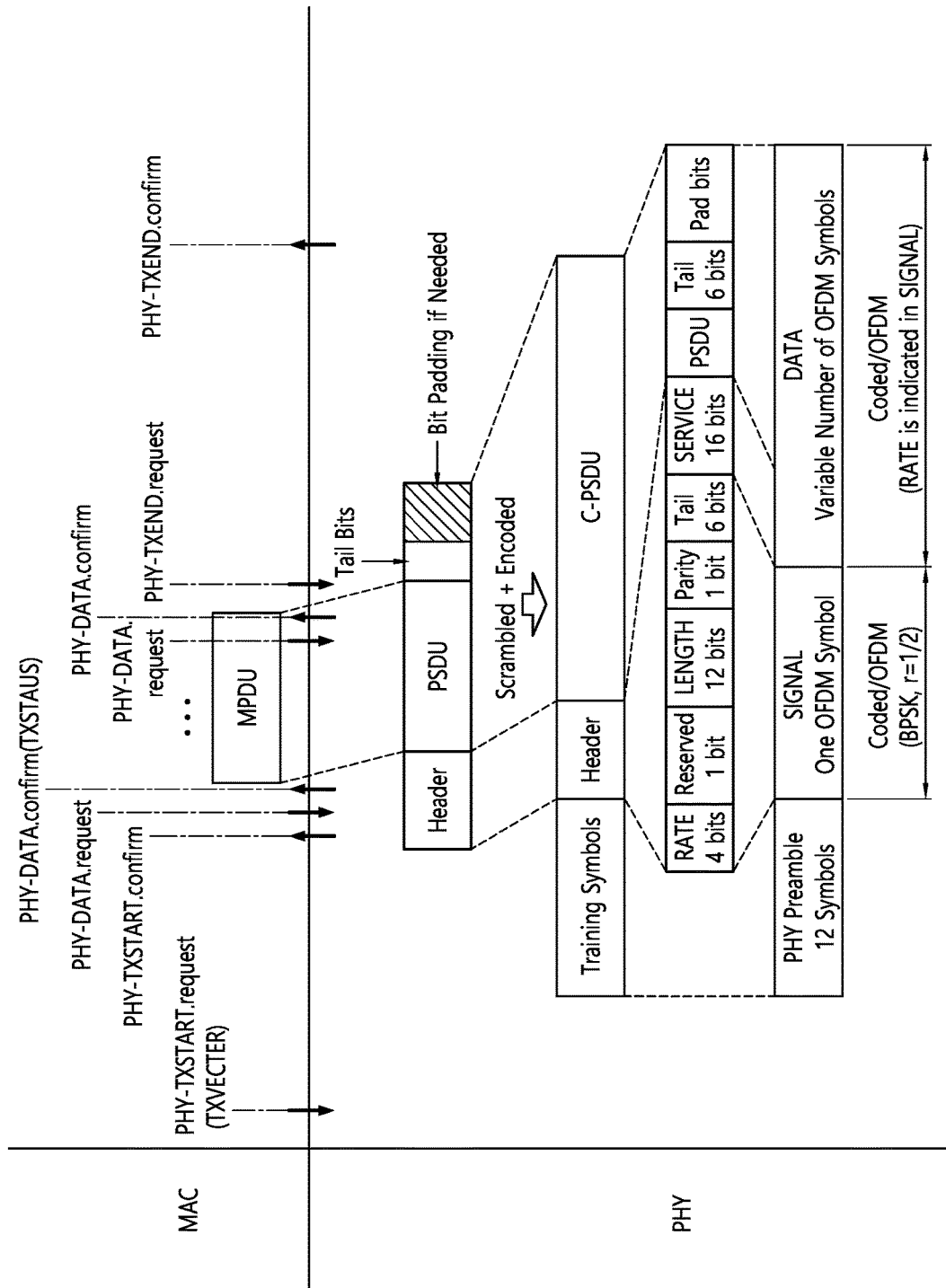
FIG. 20 is a diagram for explaining an operation of a transmitting STA that generates a PPDU based on a Single-MPDU.

FIG. 20 is a diagram for explaining an operation of a transmitting STA that generates a PPDU based on a Single-MPDU.

Referring to FIG. 20, a layer architecture of a transmitting STA (that is, an IEEE 802.11 system) may include a Medium Access Control (MAC) layer (or sublayer) and a Physical (PHY) layer (or sublayer).

The transmitting STA (for example, the first STA 110 of FIG. 1) may generate/configure a MAC Protocol Data Unit (MPDU) through a Medium Access Control (MAC) layer. The PHY layer may provide an interface to the MAC layer through TXVECTOR, RXVECTOR, and PHYCONFIG_VECTOR. TXVECTOR may support transmission parameters for each PPDU to the PHY layer. TXVECTOR may be delivered from the MAC layer to the PHY layer through the PHY-TXSTART.request primitive. By using the PHYCONFIG_VECTOR by the transmitting STA, the MAC layer may configure the operation of the PHY layer regardless of frame transmission or reception.

An operation in each sub-layer (or layer) will be briefly described as follows.

The MAC layer may generate one or more MAC protocol data units (MPDU) by attaching a MAC header and a frame check sequence (FCS) to a MAC service data unit (MSDU) or a fragment of MSDU delivered from an upper layer (for example, LLC). The generated MPDU may be delivered to the PHY layer.

The PHY layer may generate a physical protocol data unit (PPDU) by adding an additional field including information, required by the physical layer of a transmission/reception STA, to the physical service data unit (PSDU) received from the MAC layer. The generated PPDU may be transmitted through a wireless medium.

Since the PSDU is received by the PHY layer from the MAC and the MPDU is transmitted to the PHY layer by the MAC layer, the PSDU may be substantially the same as the MPDU.

Figure 21:
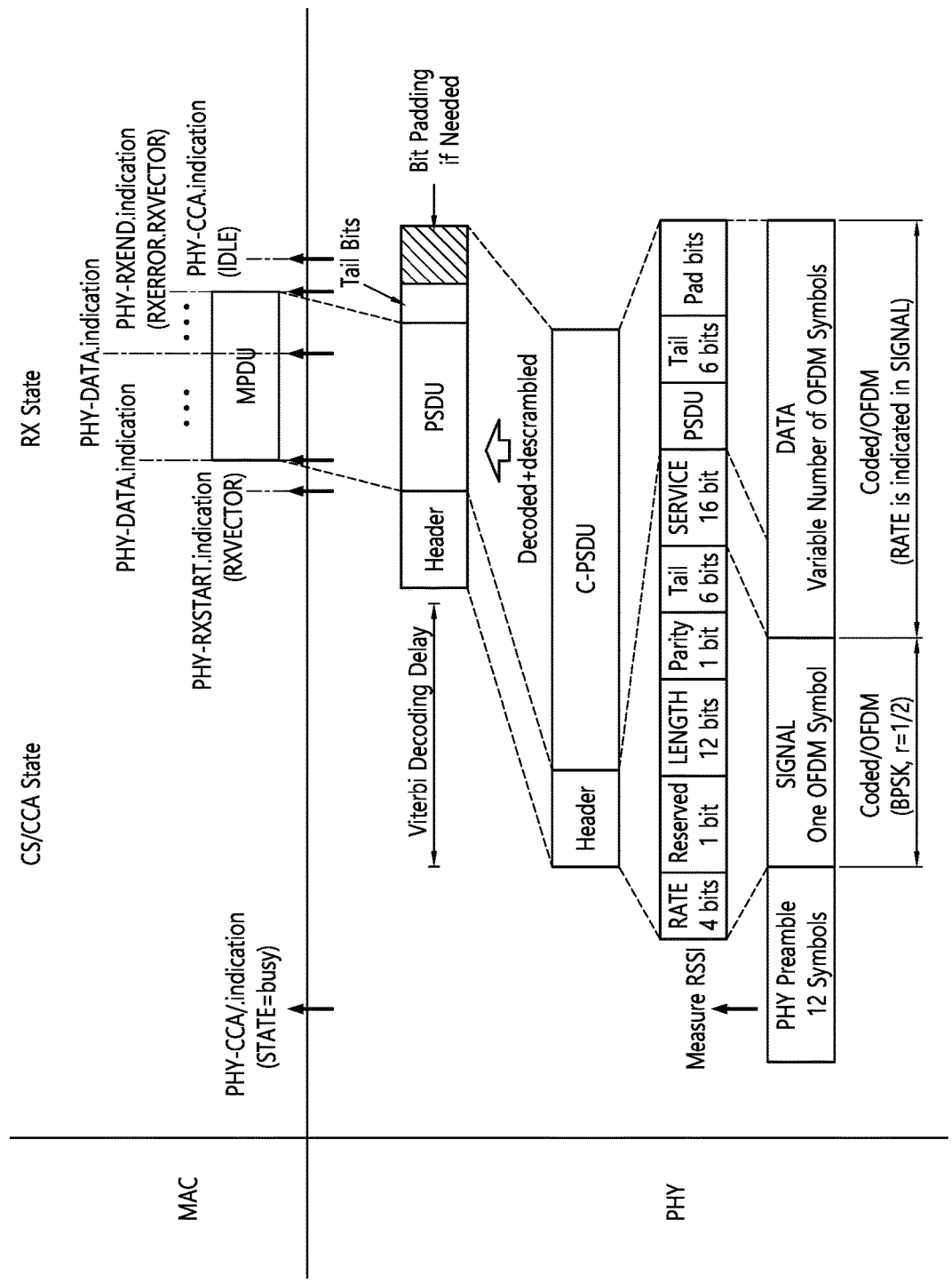
FIG. 21 is a diagram for explaining an operation of a receiving STA that receives a PPDU generated based on a Single-MPDU.

FIG. 21 is a diagram for explaining an operation of a receiving STA that receives a PPDU generated based on a Single-MPDU.

Referring to FIG. 21, a receiving STA (for example, the second STA 120 of FIG. 1) may receive a PPDU through a PHY layer. The receiving STA may include the same structure of the transmitting STA of FIG. 19, and the transmitting STA may perform an operation of generating a PPDU in reverse. That is, the receiving STA may obtain the MPDU through the received PPDU.

Specifically, using the reception RXVECTOR, the PHY layer may inform the MAC layer of the received PPDU parameter. RXVECTOR may be delivered from the PHY layer to the MAC layer through the PHY-RXSTART.indication primitive. The receiving STA may obtain an MPDU included in the received PPDU. The receiving STA may check whether there is an error in the MPDU by using the CRC of the MPDU.

Figure 22:
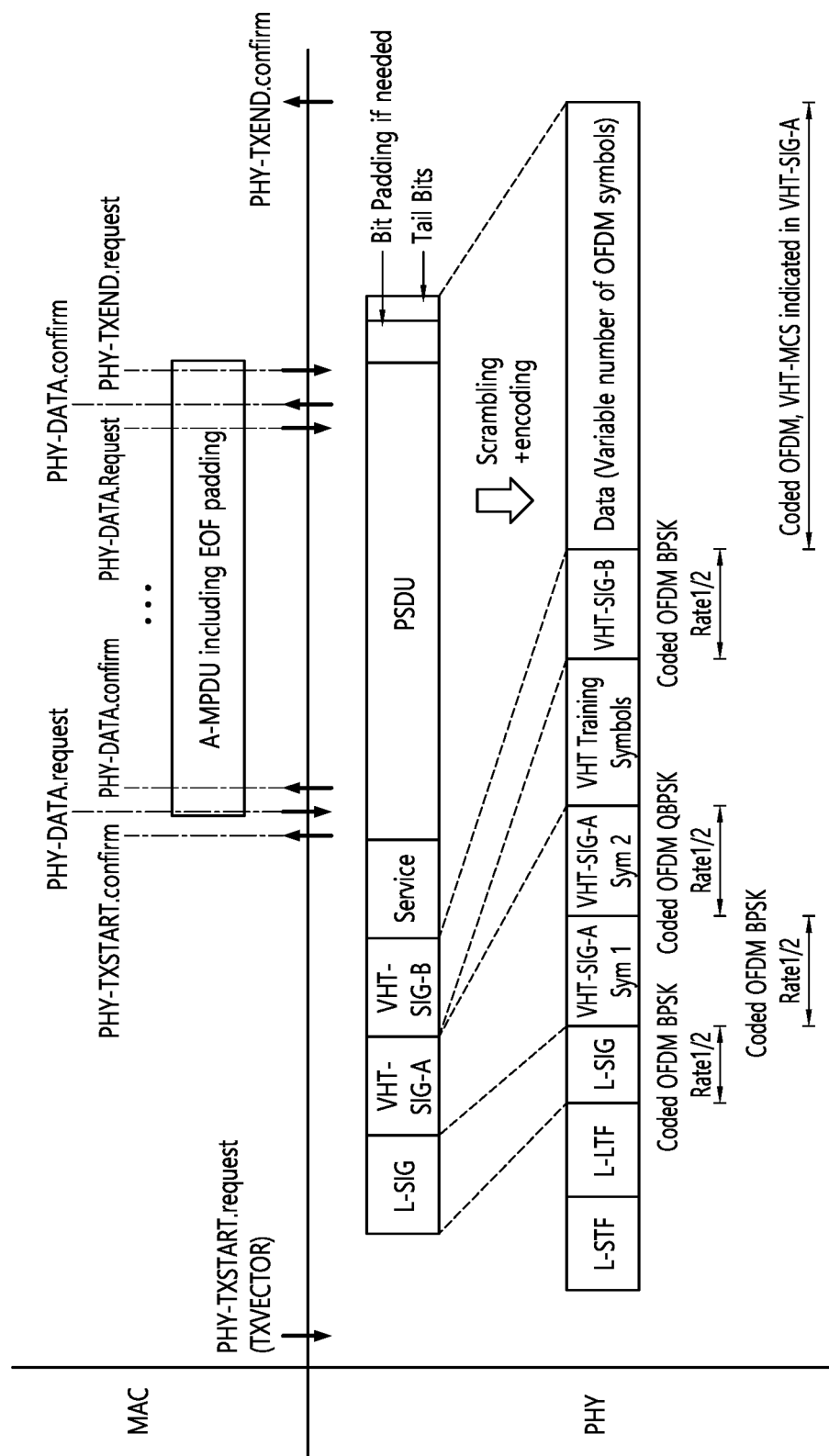
FIG. 22 is a diagram for explaining an operation of a transmitting STA that generates a PPDU based on an A-MPDU.

FIG. 22 is a diagram for explaining an operation of a transmitting STA that generates a PPDU based on an A-MPDU.

Referring to FIG. 22, a transmitting STA may include the same structure of the transmitting STA of FIG. 19. When an aggregated MPDU (A-MPDU) scheme is used, a plurality of MPDUs may be aggregated into a single A-MPDU. The MPDU aggregating operation may be performed at the MAC layer. In the A-MPDU, various types of MPDUs (for example, QoS data, Acknowledge (ACK), block ACK (BlockAck), etc.) may be merged. The PHY layer may receive an A-MPDU as a single PSDU as a MAC layer. That is, the PSDU may consist of a plurality of MPDUs. Accordingly, the A-MPDU may be transmitted through the wireless medium within a single PPDU. The transmitting STA may transmit a PPDU generated based on the A-MPDU to the receiving STA.

Figure 23:
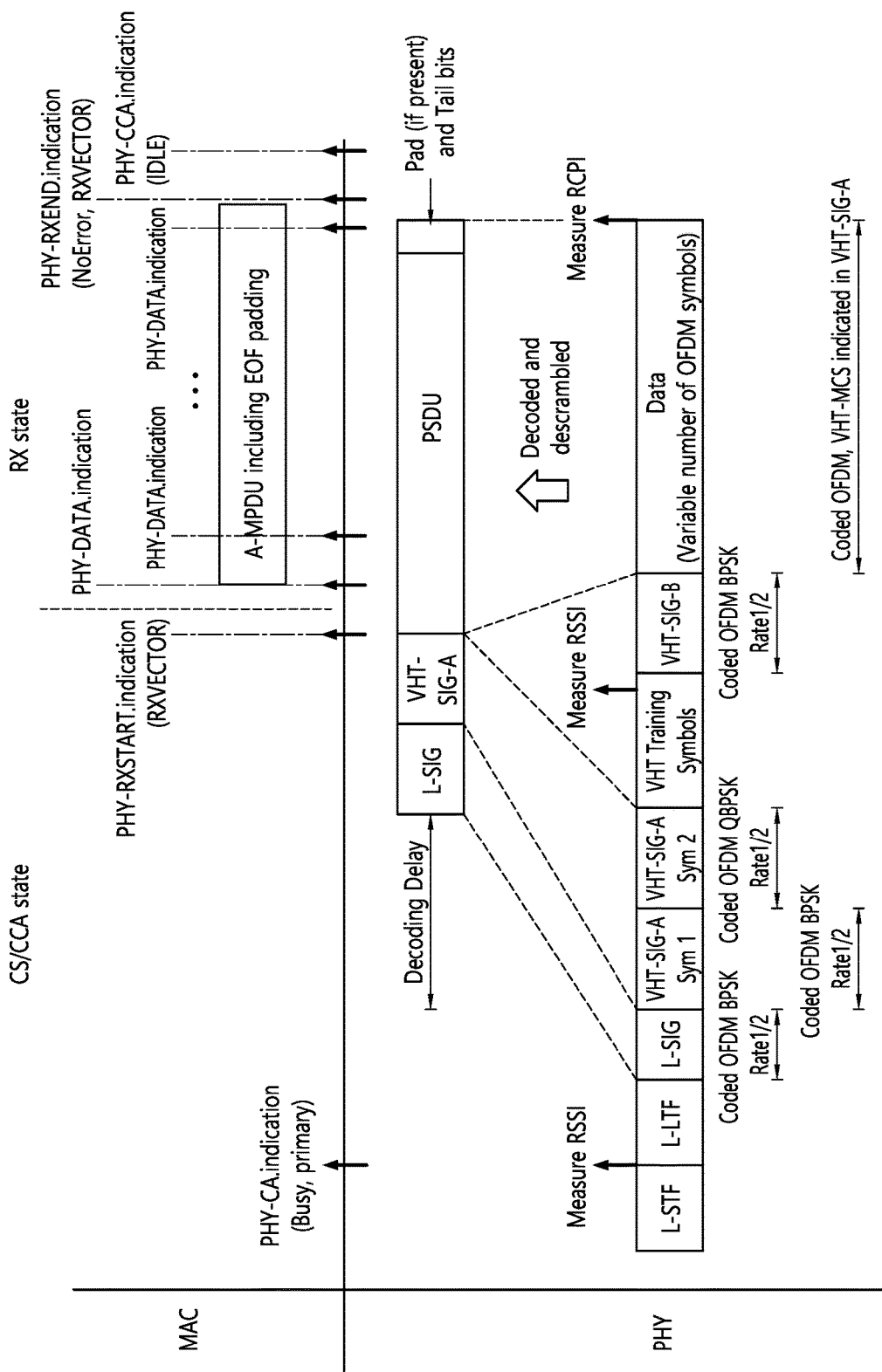
FIG. 23 is a diagram for explaining an operation of a receiving STA that receives a PPDU generated based on an A-MPDU.

FIG. 23 is a diagram for explaining an operation of a receiving STA that receives a PPDU generated based on an A-MPDU.

Referring to FIG. 23, a receiving STA (for example, the second STA 120 of FIG. 1) may receive a PPDU through a PHY layer. The receiving STA may include the same structure of the transmitting STA of FIG. 19. Upon receiving the PPDU, the receiving STA may obtain an A-MPDU. The receiving STA may determine whether each MPDU has an error by using the CRC of each MPDU constituting the A-MPDU.

Hereinafter, the HARQ scheme applied to an example of the present specification will be described.

The HARQ scheme may be a scheme combining a forward error correction (FEC) scheme and an automatic repeat request (ARQ) scheme. According to the HARQ method, the performance can be improved by checking whether data received by the PHY layer includes an error that cannot be decoded, and requesting retransmission when an error occurs.

The receiver using HARQ scheme may basically attempt error correction on received data and determine whether to retransmit using an error detection code. The error detection code may be various codes. For example, in the case of using a cyclic redundancy check (CRC), when an error in received data is detected through a CRC detection process, the receiver may transmit a non-acknowledgement or negative-acknowledgement (NACK) signal to the transmitter. Upon receiving the NACK signal, the transmitter may transmit appropriate retransmission data according to the HARQ mode. The receiver receiving the retransmission data may improve reception performance by combining and decoding the previous data and the retransmission data.

The mode of HARQ can be divided into chase combining and incremental redundancy (IR). Chase combining is a method of obtaining a signal-to-noise ratio (SNR) gain by combining the error detected data with retransmitted data without discarding it. The IR is a method in which additional redundant information is incrementally transmitted by the retransmitted data to obtain a coding gain.

Figure 24:
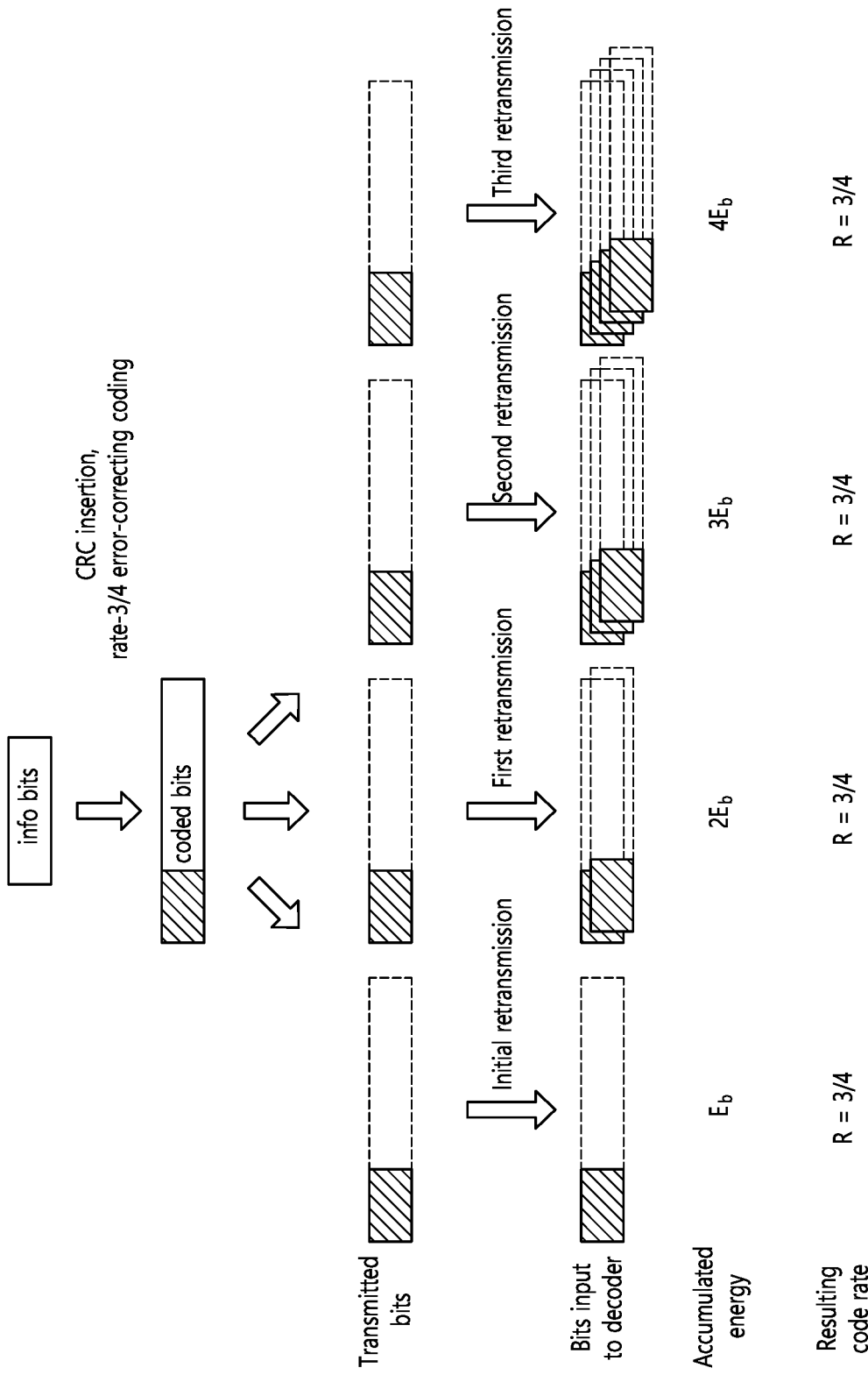
FIG. 24 is a diagram illustrating an example of chase combining.

FIG. 24 is a diagram illustrating an example of chase combining. Chase combining is a method in which the same coded bit as in the initial transmission is retransmitted.

Figure 25:
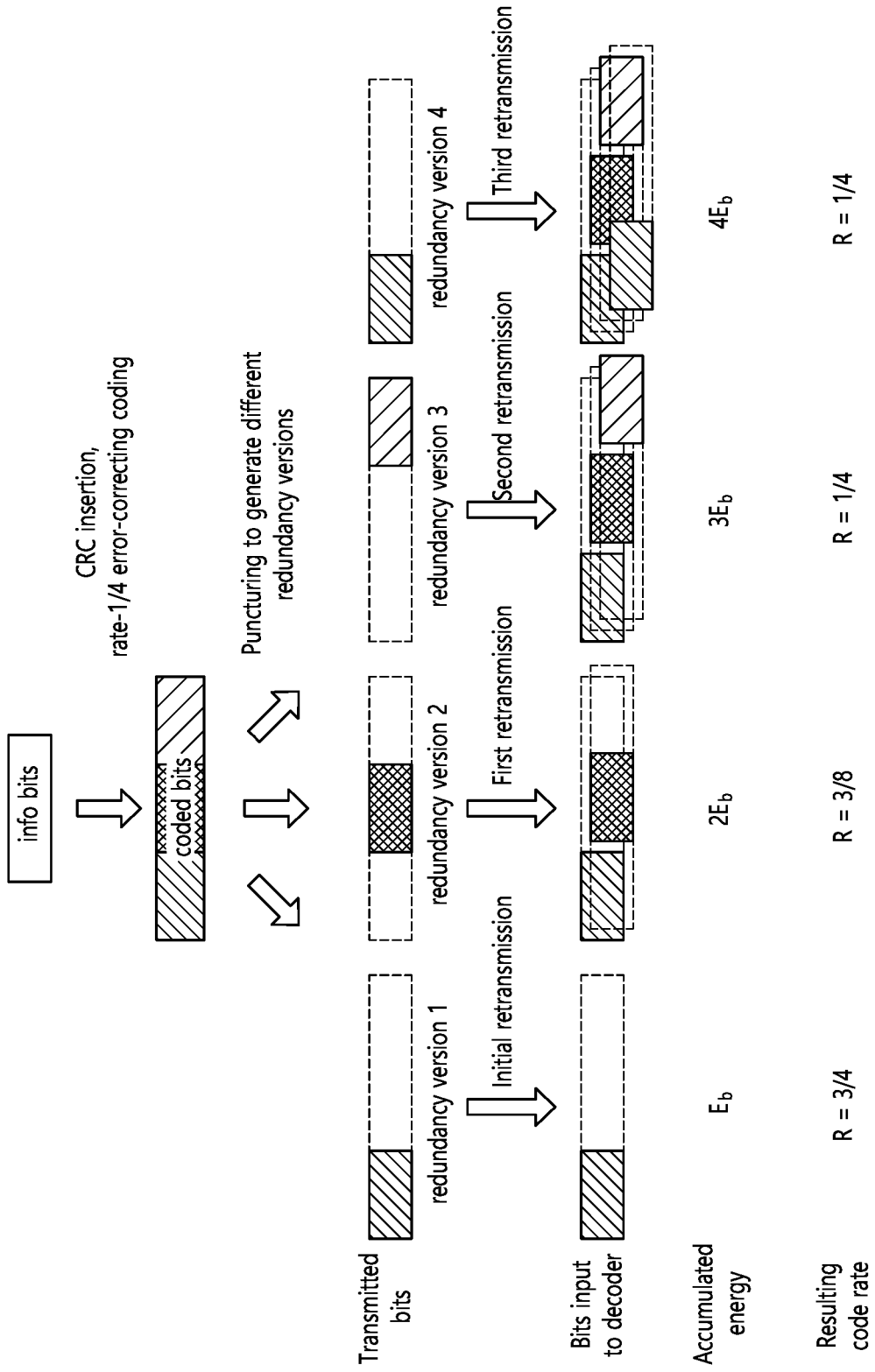
FIG. 25 is a diagram illustrating an example of an incremental redundancy (IR) method.

FIG. 25 is a diagram illustrating an example of an incremental redundancy (IR) method. In the incremental redundancy (IR) method, the coded bits that are initially transmitted and subsequently retransmitted may be different as follows. Accordingly, when the IR method is used, the STA performing retransmission generally delivers the IR version (or packet version/retransmission version) to the receiving STA. In the following drawings, it is an example that the transmitting STA performs retransmission in the order of IR version 1→IR Version 2→IR Version 3→IR Version 1. The receiving STA may combine and decode the received packet/signal.

HARQ may have the effect of expanding coverage in a low SNR environment (for example, an environment in which a transmitter and a receiver are far apart). HARQ may have the effect of increasing throughput in a high SNR environment.

According to the basic procedure of HARQ, a transmitter can transmit packets and a receiver can receive packets. The receiver may check the presence or absence of errors in the received packets. The receiver may feedback, to the transmitter, a request to retransmit erroneous packets among the received packets.

For example, the receiver may transmit a request for retransmission of erroneous packets among packets received through the ACK/NACK frame or the Block ACK frame. The transmitter may receive feedback from the receiver, and may retransmit erroneous packets based on the feedback. For another example, the transmitter may transmit erroneous packets and new packets together. Packets without errors may not be retransmitted.

The receiver may perform decoding by combining previously received erroneous packets and retransmitted packets. A method of combining packets includes a method of combining in a modulation symbol unit (for example, BPSK, QPSK, 16QAM, 64QAM, 256QAM, 1024QAM, etc.) and a method of combining in a log likelihood ratio (LLR) value unit after a de-mapper. Hereinafter, it is based on a method of combining in LLR value units. If decoding is performed by combining the previously received packet with the retransmitted packet, but an error occurs, the above procedure can be repeated as many as the preset maximum number of retransmissions.

Figure 26:
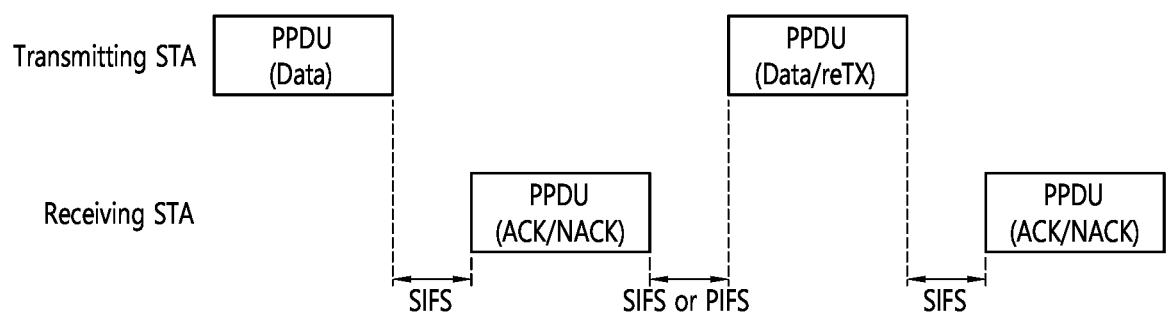
FIG. 26 is a diagram for explaining the operation of HARQ.

FIG. 26 is a diagram for explaining the operation of HARQ.

Referring to FIG. 26, a transmitting STA (for example, the first STA 110) may transmit a PPDU to a receiving STA (for example, the second STA 120). The PPDU may include data. The receiving STA may decode the received PPDU. After decoding the PPDU, the receiving STA may check whether there is an error in the PPDU by using a Frame Check Sequence (FCS) (or Cyclic Redundancy Check (CRC)).

If there is no error in the PPDU, the receiving STA may transmit an ACK frame to the transmitting STA after a specified time (for example, SIFS). In other words, the receiving STA may transmit an ACK frame to the transmitting STA after a specified time on the basis that there is no error in the PPDU.

When there is an error in the PPDU, the receiving STA may transmit a NACK frame to the transmitting STA after a specified time (for example, SIFS). In other words, the receiving STA may transmit a NACK frame to the transmitting STA after a specified time based on an error in the PPDU. When the receiving STA transmits a NACK frame to the transmitting STA, the receiving STA may store an error packet (for example, a PPDU or a data field) in the PHY layer. In other words, the receiving STA may store the packet with an error through the PHY layer based on the NACK frame.

The transmitting STA may transmit (or retransmit) a packet (or PPDU) reported as an error after a specified time (for example, SIFS, PIFS, or DIFS). In addition, the transmitting STA may transmit (or retransmit) a packet (or PPDU) reported as an error when performing contention and the backoff count value becomes {0}. According to an embodiment, the transmitting STA may additionally transmit a new packet together with the packet reported as an error.

Thereafter, the receiving STA may receive the received packet reporting that there is an error. The receiving STA may perform decoding after combining the stored packet with the re-received packet. The receiving STA may determine whether there is an error in the re-received packet through decoding. In this case, the receiving STA may determine whether there is an error between the stored packet and the re-received packet.

The receiving STA may transmit the re-received packet to the MAC layer when there is no error in the re-received packet. If there is an error in the re-received packet, the receiving STA may again transmit a NACK frame to the transmitting STA and repeat the above-described procedure. In other words, the receiving STA may transmit the received packet to the MAC layer on the basis that there is no error in the received packet. The receiving STA may transmit a NACK frame again to the transmitting STA based on an error in the received packet, and repeat the above-described procedure.

In order to support HARQ by the transmitting STA and the receiving STA, a unit of retransmission must be defined. Hereinafter, a criterion for determining whether a packet has an error or a unit for retransmission may be defined as a HARQ unit. Hereinafter, the criteria for determining whether or not there is an error in the packet, or a unit for retransmission may be defined as a HARQ unit. For example, the HARQ unit may include a Low Density Parity Check Code (LDPC) codeword (CW) or an MPDU. As an example, when the transmitting STA uses LDPC for encoding, the HARQ unit may be set in units of LDPC CW.

According to an embodiment, the HARQ unit may be referred to by various terms. For example, the HARQ unit may be referred to as a data block, unit, or HARQ transmission unit. Hereinafter, for convenience of description, the HARQ unit may be described as LDPC CW, which is an example of the HARQ unit. Also, LDPC CW may be referred to by various terms. For example, the LDPC CW may also be referred to as a codeword (CW).

In the following specification, a low density parity check code (LDPC) encoding process for applying a conventional parity check matrix to HARQ IR may be described.

The transmitting STA may newly set a redundancy version of the retransmitted packet and may transmit the packet, in order to improve the coupling performance of the receiving STA during retransmission. As shown in FIG. 25, in the HARQ IR scheme, as the number of retransmissions increases, received redundancy may increase.

Hereinafter, in order to apply HARQ IR, a method of generating a new redundancy version during retransmission by using a conventional parity check matrix without defining a new parity check matrix may be proposed.

In the conventional WLAN system, the following procedure may be performed for LDPC encoding.

1. Conventional LDPC Encoding Procedure

The LDPC encoding procedure of the conventional 802.11 standard may be performed based on the following steps (a) to (f).

(a) calculating the number of available bits ($N_{avbits}$) that fit into the minimum number of OFDM symbols that can fit in the data field of the packet;

(b) calculating the integer number of LDPC codewords to be transmitted and the length of the codewords to be used;

(c) before encoding, calculating the number of shortening bits to be padded to data bits (d) calculating the number of bits to be punctured in the codeword after encoding (e) calculating the number of coded bits to be repeated (f) for each codeword, processing the data using the number of shortening bits per codeword calculated in step (c), puncturing or repeating bits per codeword calculated in steps (d) and (e)

(g) aggregating all codewords, and parsing them

Accordingly, the transmitting STA may perform LDPC encoding based on steps (a) to (g). Thereafter, the transmitting STA may transmit the PPDU to the receiving STA based on the LDPC encoding. The receiving STA may perform a check-sum process on CWs in the received PPDU. For example, the check-sum process may be performed based on whether equation 1 is satisfied.

$$H \times c^T = 0 \qquad \text{[Equation 1]}$$

Referring to equation 1, H may mean a parity check matrix. 'c' may mean a codeword.

2. LDPC Encoding Procedure for Applying HARQ IR

In the following specification, a method for applying HARQ IR while maintaining a parity check matrix defined in a conventional standard may be proposed.

According to an embodiment, the transmitting STA may determine a first code rate. The transmitting STA may determine one of the values included in a code rate set as the first code rate. The first code rate may mean a code rate of data to be transmitted.

According to an embodiment, the transmitting STA may encode the first data based on the second code rate. The second code rate may be set lower than the first code rate. For example, the transmitting STA may set the first code rate to 3/4 and the second code rate to 1/2.

According to an embodiment, the transmitting STA may generate the second data based on the first code rate and the encoded first data. For example, the transmitting STA may puncture the first portion of the encoded first data based on the first code rate. Thereafter, the transmitting STA may generate second data based on puncturing the first portion of the first data. For example, the code rate of the encoded first data may be set as the second code rate. The transmitting STA may generate second data which is set as the first code rate, based on puncturing. As an example, the transmitting STA may generate the second data by puncturing parity bits of the encoded first data.

In other words, the transmitting STA may perform encoding, in advance, by a second code rate lower than the first code rate, by considering the puncturing step. That is, the transmitting STA may set the code rate of data to be transmitted as the first code rate by performing puncturing.

According to an embodiment, the transmitting STA may transmit the generated second data to the receiving STA.

Specific operations for performing the above-described steps may be described below. The first code rate may be referred to as a designated code rate. The second code rate may mean a code rate used during encoding.

(1) Encoding at a Code Rate that is One Step Lower than the Designated Code Rate According to an embodiment, the code rate set may include a code rate that the transmitting STA can use when encoding. For example, the code rate set may include 1/2, 2/3, 3/4, or 5/6. The transmitting STA may perform encoding based on one of the values included in the code rate set.

(1)-a) The designated code rate may mean a code rate received from the MAC layer. The designated code rate may be transmitted through the primitive of TX VECTOR.

(1)-b) If the primitive of the TX VECTOR consists of an MCS rather than a code rate, the transmitting STA may perform encoding using a code rate that is one step lower than the code rate constituting the designated MCS. In addition, the transmitting STA may maintain the modulation order constituting the designated MCS as it is.

(1)-c) A code rate that is one step lower may mean a code rate that is one lower in the code rate set. For example, the code rate set may be configured as [1/2, 2/3, 3/4, 5/6] based on the 802.11 a/n/ac/ax standard. For example, a code rate one step lower than a code rate of 2/3 may be a code rate of 1/2. However, the code rate set is not limited to the above-described example. For example, a code rate set may be configured by adding a new code rate.

(1)-d) When a code rate lower by one step is used, when puncturing in step (2), which will be described later, fewer bits may be punctured than when a code rate lower by two or more steps is used. In general, since a parity check matrix is designed to have optimal performance in an environment in which puncturing is not performed, performance degradation may occur as the number of bits to be punctured increases. Therefore, according to an embodiment of the present specification, there is the effect of improving performance by performing encoding using a code rate that is one step lower.

(1)-e) According to an embodiment, unlike the above-described embodiment, the transmitting STA may not use a code rate that is one step lower, and may use 1/2 as a code rate fixedly regardless of the designated code rate. That is, the transmitting STA may perform encoding using a parity check matrix having a code rate of 1/2. In addition, the receiving STA may also perform decoding based on a code rate of 1/2. According to the above embodiment, by setting the code rate to 1/2, there is the effect that the implementation of a module (or circuit) for performing encoding can be simplified.

(2) Puncturing the Parity Bits to Make it the Same Code Rate as the Designated Code Rate (2)-a) The coded bits generated/determined/calculated through step (1) may include a large number of parity bits. Accordingly, the length of the OFDM symbol or PPDU may be increased. In order to maintain the same length of the OFDM symbol or PPDU as when HARQ is not applied, the transmitting STA may perform puncturing to have the same code rate as the designated code rate.

(2)-b) For initial transmission, when the number of bits punctured by the transmitting STA is 'p', the transmitting STA may puncture 'p' parity bits forward from the last bit of the code word in the same manner as defined in the 802.11 a/n/ac/ax standard.

(3) In Retransmission, Using a Puncturing Pattern Different from that of the First Transmission (3)-a) When retransmission of a packet is required, the transmitting STA may perform puncturing at a location other than the location punctured in step (2), and then transmit the packet. That is, bits punctured in the initial transmission may be retransmitted. In addition, a packet in which bits, that were not punctured in the initial transmission, are punctured may be transmitted.

(3)-b) When the number of retransmissions is two or more, a punctured position in a packet may be set so that the punctured position during the initial transmission does not overlap with the punctured position during retransmission.

(3)-c) In general, LDPC coded bits may be composed of information bits (or systematic bits) and parity bits. According to an embodiment, based on the number of retransmissions, puncturing may not be performed on the portion of the parity bits, but puncturing may be performed on the systematic bits. In other words, the transmitting STA may perform puncturing on the systematic bits as well as the parity bits based on the number of retransmissions.

Figure 27:
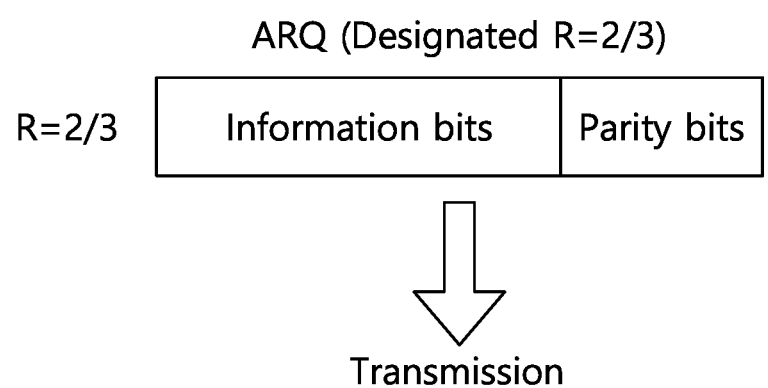
FIG. 27 is a diagram for explaining an example of an encoding process for ARQ.

FIG. 27 is a diagram for explaining an example of an encoding process for ARQ.

Referring to FIG. 27, a transmitting STA may encode information to be transmitted based on a code rate. For example, the transmitting STA may set the code rate to 2/3. The transmitting STA may perform encoding of information to be transmitted based on a code rate of 2/3.

According to an embodiment, the transmitting STA may generate a packet by performing an encoding process. The packet may include information bits and/or parity bits. When the code rate is set to 2/3, the ratio of the number of bits of information bits and parity bits may be set to 2:1. That is, the ratio of information bits among information bits and parity bits may be set to 2/3.

According to an embodiment, the transmitting STA may transmit the encoded packet to the receiving STA.

Figure 28:
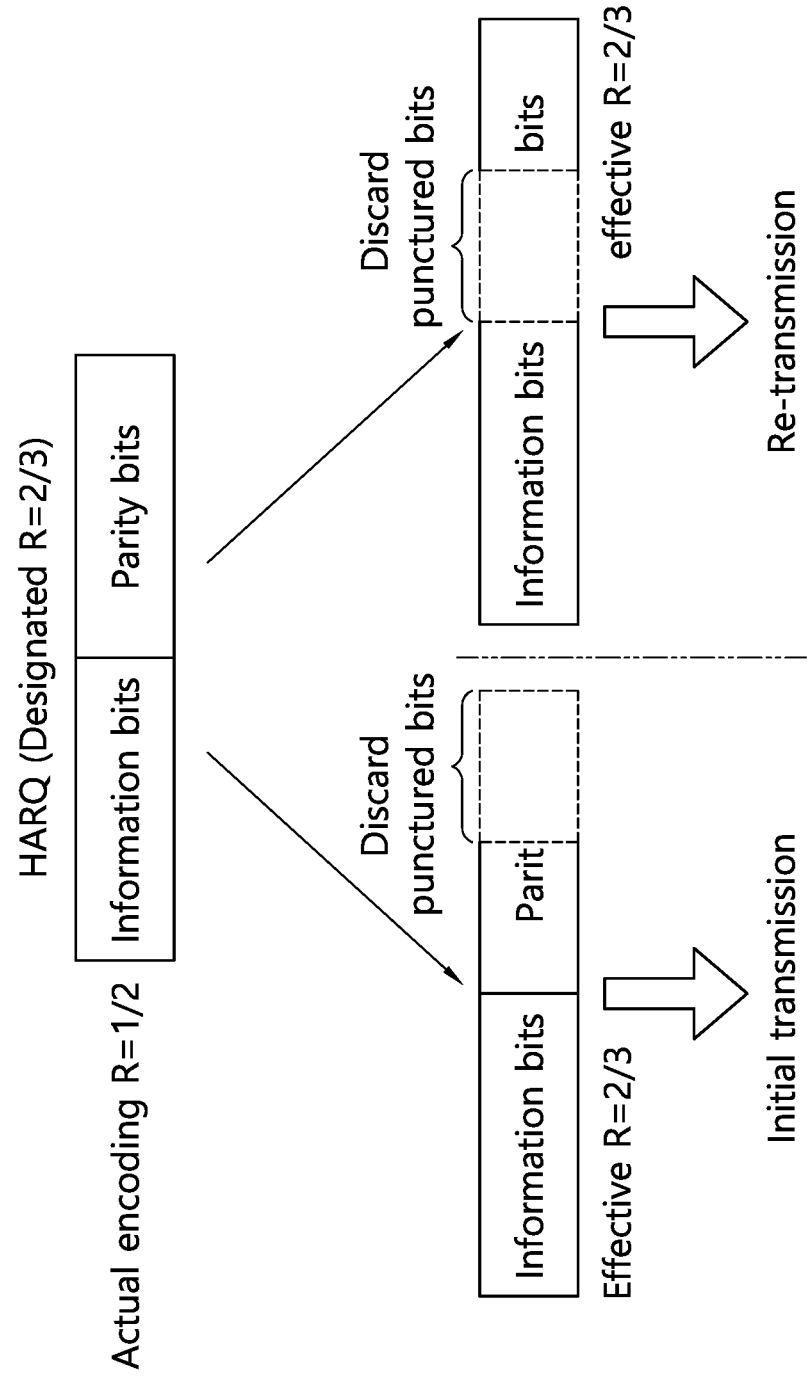
FIG. 28 is a diagram for explaining an example of an encoding process for HARQ.

FIG. 28 is a diagram for explaining an example of an encoding process for HARQ.

Referring to FIG. 28, an example of an encoding process during the initial transmission and retransmission may be illustrated in FIG. 28. FIG. 28 is an example in which the number of retransmissions is assumed to be one, and the example of FIG. 28 may also be applied to a case in which a plurality of retransmissions are performed.

According to an embodiment, the transmitting STA may set a designated code rate. For example, the transmitting STA may set one of the code rates included in the code rate set as the designated code rate. The code rate set may include 1/2, 2/3, 3/4, or 5/6. As an example, the transmitting STA may determine/set the designated code rate to 2/3.

According to an embodiment, the transmitting STA may encode the first data with a code rate lower than the designated code rate (that is, the actual code rate). For example, when the designated code rate is 2/3, the transmitting STA may set the code rate to 1/2 and encode the first data. The encoded first data may include information bits and/or parity bits. For example, the transmitting STA may encode the first data at a code rate one step lower than the designated code rate (that is, an actual code rate). For example, a code rate lower by one level may mean a code rate lower by one of the values included in the code rate set. As an example, the code rate set may be set to [1/2, 2/3, 3/4, 5/6]. When the designated code rate is set to 2/3, the code rate one step lower than the designated code rate may be 1/2.

According to an embodiment, the transmitting STA may puncture the encoded first data. The transmitting STA may generate second data based on the designated code rate and the encoded first data. The transmitting STA may puncture the first portion of the encoded first data based on the designated code rate. The transmitting STA may generate the second data based on puncturing the first portion of the encoded first data.

That is, the transmitting STA may puncture the encoded first data based on the designated code rate. Accordingly, the code rate of the second data may be set as the designated code rate. For example, the transmitting STA may perform puncturing so that the code rate of the encoded first data becomes 2/3. As an example, the transmitting STA may generate the second data by puncturing the first part of the parity bits. The code rate of the second data may be set to 2/3.

The transmitting STA may transmit the second data to the receiving STA. Thereafter, the transmitting STA may receive a data retransmission request signal. The transmitting STA may perform data retransmission based on the HARQ IR.

According to an embodiment, during retransmission, the transmitting STA may transmit, to the receiving STA, a third data punctured differently from the second data. For example, the transmitting STA may puncture the encoded first data in a different way than the second data.

According to an embodiment, the transmitting STA may generate the third data based on the designated code rate and the encoded first data. The transmitting STA may puncture the second portion of the encoded first data based on the designated code rate. The transmitting STA may generate the third data based on puncturing the second portion of the encoded first data.

That is, the transmitting STA may puncture the encoded first data based on the designated code rate. Accordingly, the code rate of the third data may be set as the designated code rate. For example, the transmitting STA may perform puncturing so that the code rate of the encoded first data becomes 2/3. As an example, the transmitting STA may generate the third data by puncturing the second part of the parity bits. The code rate of the third data may be set to 2/3. Thereafter, the transmitting STA may transmit the third data to the receiving STA.

Figure 29:
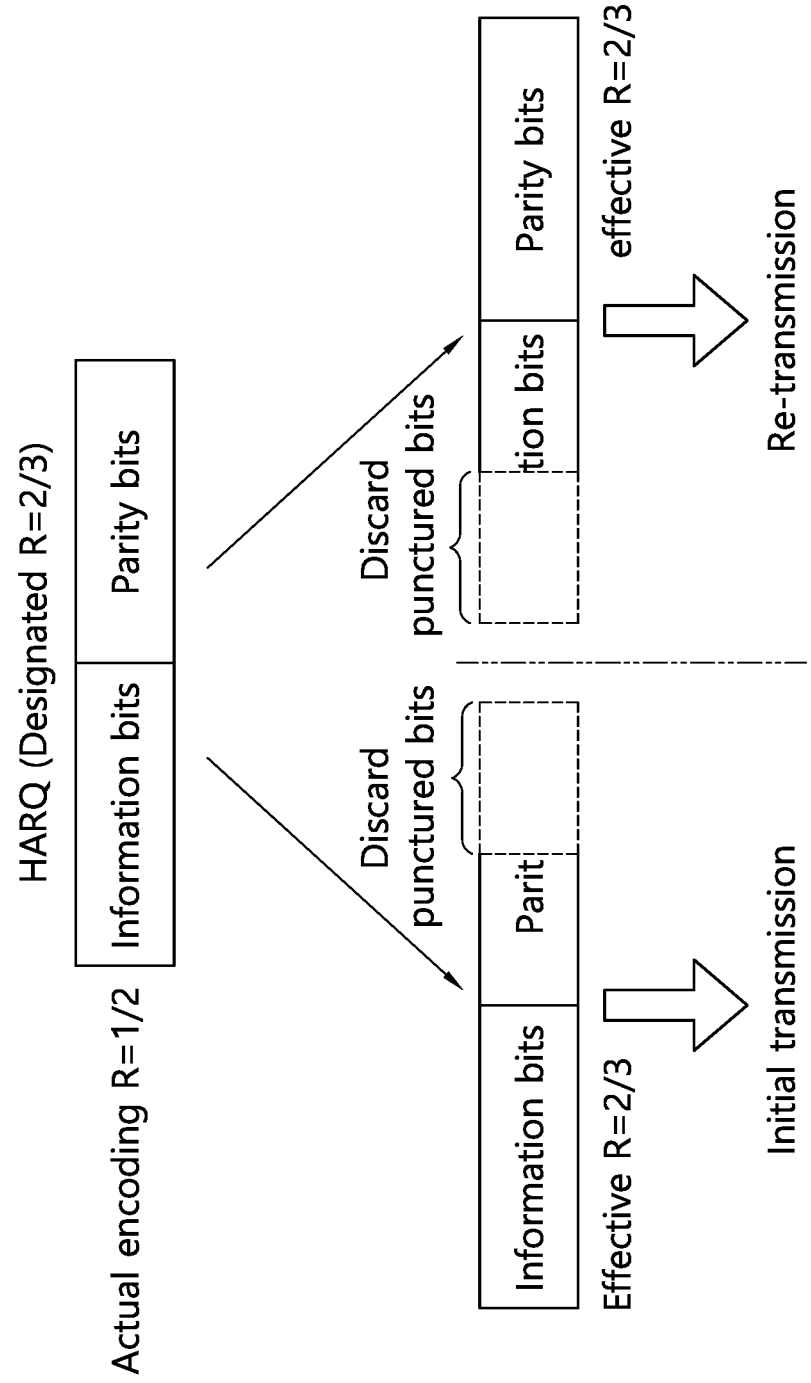
FIG. 29 is a diagram for explaining another example of an encoding process for HARQ.

FIG. 29 is a diagram for explaining another example of an encoding process for HARQ.

Referring to FIG. 29, the transmitting STA may perform the same operation shown in FIG. 28 during the initial transmission. However, when performing retransmission, the transmitting STA may puncture information bits as well as parity bits. For example, the transmitting STA may puncture the encoded first data based on the designated code rate. Accordingly, the code rate of the third data may be set as the designated code rate. For example, the transmitting STA may perform puncturing so that the code rate of the encoded first data becomes 2/3. As an example, the transmitting STA may generate the third data by puncturing at least some of the information bits. The code rate of the third data may be set to 2/3. Thereafter, the transmitting STA may transmit the third data to the receiving STA.

Accordingly, the transmitting STA may transmit the second data by puncturing parity bits during the initial transmission. In addition, the transmitting STA may transmit the third data by puncturing at least a portion of information bits or parity bits during retransmission.

Hereinafter, formulas and parameters for implementing the above-described embodiment may be described. Equations and parameters may be configured based on the existing LDPC encoding process for ARQ. In the EHT standard, an LDPC encoding scheme for HARQ may be defined as an alternative to ARQ.

3. Newly Set LDPC Encoding Equations and Parameters
(1) LDPC Code Rate (or Coding Rates) and Length of Codeword Block for ARQ and HARQ According to an embodiment, code rates (or coding rates), information block lengths, and/or codeword block lengths may be shown in Tables 5 and 6.

TABLE 5

| Coding rate (R) | LDPC information block length (bits) | LDPC codeword block length (bits) |
|---|---|---|
| 1/2 | 972 | 1944 |
| 1/2 | 648 | 1296 |
| 1/2 | 324 | 648 |
| 2/3 | 1296 | 1944 |
| 2/3 | 864 | 1296 |
| 2/3 | 432 | 648 |
| 3/4 | 1458 | 1944 |
| 3/4 | 972 | 1296 |

TABLE 6

| Coding rate (R) | LDPC information block length (bits) | LDPC codeword block length (bits) |
|---|---|---|
| 3/4 | 486 | 648 |
| 5/6 | 1620 | 1944 |
| 5/6 | 1080 | 1296 |
| 5/6 | 540 | 648 |

(2) LDPC Encoder for ARQ and HARQ

For each of the three possible codeword block lengths, the LDPC encoder may support encoding of rates of 1/2, 2/3, 3/4, and/or 5/6. The LDPC encoder may be systematic. For example, the LDPC encoder (that is, transmitting STA) may generate a codeword (that is, $c=(i_0, i_1, \ldots, i_{k-1}, p_0, p_1, \ldots, p_{(m-k-1)})$ of size n by encoding an information block (that is, $c=(i_0, i_1, \ldots, i_{(k-1)})$ of size k.

The LDPC encoder may generate a codeword by adding (n-k) parity bits to satisfy Equation (1) described above. In the above-mentioned Equation 1, H may be a parity check matrix of (n-k)×n. The selection of the codeword block length (that is, n) may be established/achieved via the LDPC encoding process described below.

(3) Parity Check Matrix for ARQ and HARQ

According to an embodiment, each parity check matrix may be divided into square sub-blocks. The square sub-block may be set to a size of Z×Z. The square sub-blocks may include cyclic-permutations of an identity matrix or a null sub-matrix. A cyclic permutation matrix (that is, $P_i$) can be obtained by periodically shifting the identity matrix of Z×Z to the right by 'i' elements. $P_0$ may mean an identity matrix of Z×Z.

FIGS. 30 to 32 show examples of sub-blocks constituting a parity check matrix.

Referring to FIGS. 30 to 32, the parity check matrix may be divided into square sub-blocks. The sub-block may include a cyclic permutation matrix. Here, the cyclic permutation matrix may be set to a size of Z×Z. For example, Z may be set to 8.

Referring to FIG. 30, a cyclic permutation matrix (that is, $P_0$) may be illustrated.

Referring to FIG. 31, a cyclic permutation matrix (that is, $P_1$) may be illustrated.

Referring to FIG. 32, a cyclic permutation matrix (that is, $P_5$) may be illustrated.

Based on the aforementioned cyclic permutation matrices, a parity check matrix may be constructed. An example of a parity check matrix may be described below.

FIG. 33 is a diagram for explaining an example of a parity check matrix.

Referring to FIG. 33, a parity check matrix may be set in various ways. FIG. 33 shows matrix prototypes in the case where the block length (that is, n) of the codeword is 648 bits. In this case, the size of the sub-block (that is, Z) may be 27 bits. An integer (that is, i) illustrated in FIG. 33 may mean a cyclic permutation matrix (for example, Pt). An empty element shown in FIG. 33 may mean a null sub-matrix.

According to an embodiment, a parity check matrix may be set differently based on a code rate. FIG. 33 may be an example of a parity check matrix when the code rate is 1/2, 2/3, 3/4, or 5/6.

Although not shown, the parity check matrix may be set in various ways. For example, the parity check matrix may be set based on the block length (that is, n) of the codeword. As an example, the block length (that is, n) of the codeword may be set to 1296 bits or 1944 bits. In this case, the size of the sub-block (that is, Z) may be set to 54 bits or 81 bits.

(4) LDPC PPDU Encoding Process for HARQ

The transmitting STA may perform steps a) to g) to encode the LDPC PPDU.

a) Calculating the number of available bits (that is, $N_{avbits}$) that fit into the minimum number of OFDM symbols that can fit in the data field of the packet;

$$N_{pld} = \text{length} \times 8 + 16 \quad \text{[Equation 2]}$$

$$N_{avbits} = N_{CBPS} \times m_{STBC} \times \left\lceil \frac{N_{pld}}{N_{CBPS} \times R \times m_{STBC}} \right\rceil$$

Referring to equation 2, $N_{pld}$ may mean the number of bits of the PSDU and the service field. Length may mean a value of the length field of the SIG field (for example, EHT-SIG or HT-SIG). $N_{avbits}$ may refer to the number of available bits included in the minimum number of OFDM symbols that can be included in the data field of a packet. $m_{STBC}$ may be set to '2' when space-time block coding (STBC) is used. $m_{STBC}$ may be set to '1' when STBC is not used. $N_{CBPS}$ may mean the number of coded bits per OFDM symbol. R may mean a code rate (or coding rate). As described above, R may be defined as a value specified as a primitive of TXVECTOR.

b) Calculating the integer number of LDPC codewords (that is, $N_{CW}$) to be transmitted and the length of codewords (that is, $L_{LDPC}$) to be used According to an embodiment, the integer number of LDPC codewords (that is, $N_{CW}$) to be transmitted and the length of codewords (that is, $L_{LDPC}$) to be used may be calculated/set as shown in Table 7.

TABLE 7

| Range of $N_{avbits}$ (bits) | Number of LDPC codewords ($N_{CW}$) | LDPC codeword length $L_{LDPC}$ (bits) |
|---|---|---|
| $N_{avbits} \leq 648$ | 1 | 1296, if $N_{avbits} \geq N_{pld} + 912 \times (1 - R)$ 648, otherwise |
| $648 < N_{avbits} \leq 1296$ | 1 | 1944, if $N_{avbits} \geq N_{pld} + 1464 \times (1 - R)$ 1296, otherwise |
| $1296 < N_{avbits} \leq 1944$ | 1 | 1944 |
| $1944 < N_{avbits} \leq 2592$ | 2 | 1944, if $N_{avbits} \geq N_{pld} + 2916 \times (1 - R)$ 1296, otherwise |
| $2592 < N_{avbits}$ | $\left\lceil \frac{N_{pld}}{1944 \cdot R_{HARQ}} \right\rceil$ | 1944 |

Referring to Table 7, $N_{CW}$ and $L_{LDPC}$ may be calculated/set based on $N_{avbits}$. $R_{HARQ}$ may mean a code rate one step lower than the code rate (that is, R) set in step (a), when the value of R is not 1/2. When the value of R is not 1/2, $R_{HARQ}$ may be set to 1/2. $R_{HARQ}$ and/or R may be set to one of the values included in the code rate set. For example, the code rate set may include 1/2, 2/3, 3/4, or 5/6. The value included in the code rate set may be a code rate supported by the LDPC encoder.

According to an embodiment, the $L_{LDPC}$ to which the $R_{HARQ}$ is reflected may be set as shown in Table 8.

TABLE 8

| Range of $N_{avbits}$ (bits) | Number of LDPC codewords ($N_{CW}$) | LDPC codeword length $L_{LDPC}$ (bits) |
|---|---|---|
| $N_{avbits} \leq 648$ | 1 | 1296, if $N_{avbits\_HARQ} \geq N_{pld} + 912 \times (1 - R)$ 648, otherwise |
| $648 < N_{avbits} \leq 1296$ | 1 | 1944, if $N_{avbits\_HARQ} \geq N_{pld} + 1464 \times (1 - R)$ 1296, otherwise |
| $1296 < N_{avbits} \leq 1944$ | 1 | 1944 |
| $1944 < N_{avbits} \leq 2592$ | 2 | 1944, if $N_{avbits\_HARQ} \geq N_{pld} + 2916 \times (1 - R)$ 1296, otherwise |
| $2592 < N_{avbits}$ | $\left\lceil \frac{N_{pld}}{1944 \cdot R_{HARQ}} \right\rceil$ | 1944 |

Referring to table 8, since $N_{avbits}$ means the number of bits that can be transmitted, conventionally defined $N_{avbits}$ may be used. $L_{LDPC}$ may be calculated/configured based on $N_{avbits\_HARQ}$ after $N_{avbits\_HARQ}$ is defined. The $L_{LDPC}$ set through the above process may be set to a smaller size than the $L_{LDPC}$ calculated/set through $N_{avbits}$ in table 7. Accordingly, when the $L_{LDPC}$ is set based on $N_{avbits\_HARQ}$, there is the effect that the number of bits to be punctured can be reduced. According to an embodiment, $N_{avbits\_HARQ}$ may be set by equation 3 below.

$$N_{avbits\_HARQ} = N_{CBPS} \times m_{STBC} \times \left\lceil \frac{N_{pld}}{N_{CBPS} \times R_{HARQ} \times m_{STBC}} \right\rceil \quad \text{[Equation 3]}$$

Referring to equation 3, $N_{avbits}$ may mean the number of available bits included in the minimum number of OFDM symbols that can be included in the data field of a packet, when $R_{HARQ}$ is applied.

c) Before encoding, calculating the number of shortening bits ($N_{shrt}$) to be padded to the data bits According to an embodiment, $N_{shrt}$ may be calculated/set through equation 4.

$$N_{shrt} = \max(0, (N_{CW} \times L_{LDPC} \times R_{HARQ}) - N_{pld}) \quad \text{[Equation 4]}$$

Referring to equation 4, $N_{shrt}$ may mean the number of shortening bits. $N_{CW}$ may mean an integer number of LDPC codewords to be transmitted. $L_{LDPC}$ may mean the length of codewords to be used. R=may mean a code rate one step lower than the code rate (that is, R) set in step (a), when the value of R is not 1/2. $N_{pld}$ may mean the number of bits of PSDU and service field.

(d) Calculating the number of bits to be punctured (that is, $N_{punc}$) in the codeword after encoding The number of bits to be punctured (that is, $N_{punc}$) in the codeword after encoding may be calculated/set based on equation (5).

$$N_{punc} = \max(0, (N_{CW} \times L_{LDPC}) - N_{avbits} - N_{shrt}) \quad \text{[Equation 5]}$$

Referring to equation 5, $N_{punc}$ may mean the number of bits to be punctured in the codeword after encoding. $N_{CW}$ may mean an integer number of LDPC codewords to be transmitted. $L_{LDPC}$ may mean the length of codewords to be used. $R_{HARQ}$ may mean a code rate one step lower than the code rate (that is, R) set in step (a), when the value of R is not 1/2. Nod may mean the number of bits of PSDU and service field. $N_{shrt}$ may mean the number of shortening bits.

According to an embodiment, in the prior art, when puncturing more than a specified ratio occurs, a method for reducing the number of bits to be punctured by recalculating $N_{avbits}$ and $N_{punc}$ has been proposed. Accordingly, in the embodiment proposed in this specification, in addition to the conventional method for reducing the number of punctured bits, three more options may be proposed.

Option 1

According to Option 1, when the condition of equation 6 is satisfied, $N_{avbits}$ and $N_{punc}$ may be recalculated/updated according to equation 7.

if $\left((N_{punc} > 0.1 \times N_{CW} \times L_{LDPC} \times (1-R))\right.$ and [Equation 6]

$\left.\left(N_{shrt} < 1.2 \times N_{punc} \times \frac{R}{1-R}\right)\right)$ is true

OR if $(N_{punc} > 0.3 \times N_{CW} \times L_{LDPC} \times (1-R))$ is true $N_{avbits} = N_{avbits} + N_{CBPS} \times m_{STBC}$ [Equation 7]

$N_{punc} = \max(0, (N_{CW} \times L_{LDPC}) - N_{avbits} - N_{shrt})$

Referring to equation 7, $N_{avbits}$ and $N_{punc}$ on the left side of the equal sign may be updated and recalculated. That is, although expressed as an equal sign, this may mean an update that is not equal. For example, in equation 7, $N_{avbits}$ is a value obtained by adding a value, obtained by multiplying $N_{CBPS}$ and $m_{STBC}$, to existing $N_{avbits}$, which may mean that it can be newly calculated/updated.

Option 2

According to Option 2, when the condition of equation 8 is satisfied, $N_{avbits}$ and $N_{punc}$ may be recalculated/updated according to equation 9.

if $\left((N_{punc} > 0.1 \times N_{CW} \times L_{LDPC} \times (1-R_{HARQ}))\right.$ and [Equation 8]

$\left.\left(N_{shrt} < 1.2 \times N_{punc} \times \frac{R_{HARQ}}{1-R_{HARQ}}\right)\right)$ is true

OR if $(N_{punc} > 0.3 \times N_{CW} \times L_{LDPC} \times (1-R_{HARQ}))$ is true $N_{avbits} = N_{avbits} + N_{CBPS} \times m_{STBC}$ [Equation 9]

$N_{punc} = \max(0, (N_{CW} \times L_{LDPC}) - N_{avbits} - N_{shrt})$

Referring to equation 9, $N_{avbits}$ and $N_{punc}$ on the left side of the equal sign may be updated and recalculated. That is, although expressed as an equal sign, it may mean an update that is not equal. For example, in equation 9, $N_{avbits}$ is a value obtained by adding a value, obtained by multiplying $N_{CBPS}$ and $m_{STBC}$, to existing $N_{avbits}$, which may mean that it can be newly calculated/updated.

Option 3

According to Option 3, both Option 1 and Option 2 may be applied. After $N_{avbits}$ and $N_{punc}$ are recalculated/updated based on Option 1, $N_{avbits}$ and $N_{punc}$ may be recalculated/updated again based on Option 2.

According to an embodiment, punctured bits may be equally distributed to all codewords by using the first ($N_{punc}$ mod $N_{cw}$) codewords punctured by 1 bit more than the remaining codewords. Hereinafter, $N_{ppcw}$ may be newly defined. $N_{ppcw}$ may be defined through equation 10.

$$N_{ppcw} = \left\lfloor \frac{N_{punc}}{N_{CW}} \right\rfloor$$ [Equation 10]

Referring to equation) 10, the operation $\lfloor x \rfloor$ may mean floor(x). The operation $\lfloor x \rfloor$ may mean a maximum integer less than or equal to x.

In the initial transmission, if $N_{ppcw} > 0$, puncturing may be performed by discarding parity bits (that is, $p_{n-k-Nppcw-1}, \ldots, p_{n-k-1}$) of the first ($N_{punc}$ mod $N_{cw}$) codewords, and discarding parity bits (that is, $p_{n-k-Nppcw}, \ldots, p_{n-k-1}$) of codewords remaining after encoding.

In retransmission, the puncturing may be performed by discarding the parity bits and/or information bits (or systematic bits) (that is, $C_{m-1}, \ldots, C_{m+Nppcw-1}$) of the first ($N_{punc}$ mod $N_{cw}$) codewords, and discarding the parity bits (that is, $C_m, \ldots, C_{m+Nppcw-1}$) of the codewords remaining after encoding. In this case, the codeword (that is, c) may be set to $(C_0, C_1, \ldots, C_{(n-1)})$ of which size is n.

The m may be defined so that the punctured positions do not overlap for each retransmission. For example, when the maximum number of transmissions is 4, the value of m may be set as shown in Table 9.

TABLE 9

| # of TX | 1 (initial TX) | 2(1$^{st}$ reTX) | 3(2$^{nd}$ reTX) | 4(3$^{rd}$ reTX) |
|---|---|---|---|---|
| m | n- Nppcw | 1 | Floor(n/3) or Ceil(n/3) | Floor(2n/3) or Ceil(2n/3) |

According to an embodiment, the number of OFDM symbols transmitted through the PPDU may be set/calculated through equation 11.

$N_{SYM} = N_{avbits}/N_{CBPS}$ [Equation 11]

Referring to equation 11, the number of OFDM symbols transmitted through the PPDU may be set/calculated through equation 11. $N_{SYM}$ may mean the number of OFDM symbols transmitted through the PPDU. $N_{avbits}$ may refer to the number of available bits included in the minimum number of OFDM symbols that can be included in the data field of a packet. $N_{CBPS}$ may mean the number of coded bits per OFDM symbol.

(e) Calculating the number of coded bits to be repeated (that is, $N_{rep}$)

The number of coded bits to be repeated (that is, $N_{rep}$) may be calculated/set through equation 12.

$N_{rep} = \max(0, N_{avbits} - N_{CW} \times L_{LDPC} \times (1 - R_{HARQ}) - N_{pld})$ [Equation 12]

Referring to equation 12, $N_{rep}$ may mean the number of coded bits to be repeated. $N_{avbits}$ may refer to the number of available bits included in the minimum number of OFDM symbols that can be included in the data field of a packet. $N_{CW}$ may mean an integer number of LDPC codewords to be transmitted. $L_{LDPC}$ may mean the length of codewords to be used. $R_{HARQ}$ may mean a code rate one step lower than the code rate (that is, R) set in step (a), when the value of R is not 1/2. $N_{pld}$ may mean the number of bits of PSDU and service field.

According to an embodiment, the number of coded bits to be repeated may be equally distributed to all $N_{cw}$ codewords having one or more bits repeated for the first ($N_{punc}$ mod New) codewords than the remaining codewords.

Figure 34:
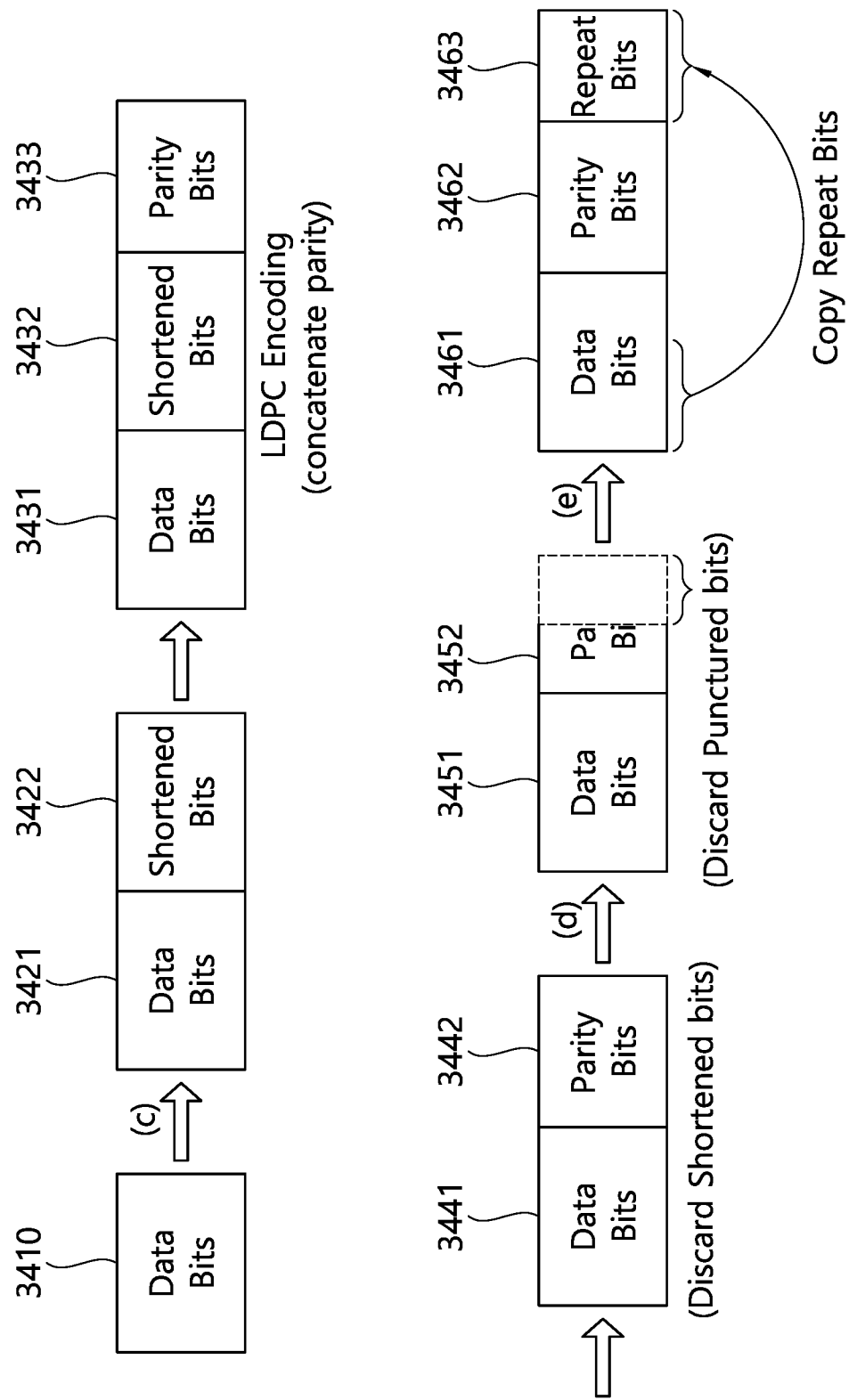
FIG. 34 is a diagram for explaining a padding and puncturing process for one codeword.

FIG. 34 is a diagram for explaining a padding and puncturing process for one codeword.

Referring to FIG. 34, Data Bits 3410 may be converted/changed into Data Bits 3421 and Shortened Bits 3422 based on step (c).

Thereafter, it may be changed/converted into Data Bits 3431, Shortened Bits 3432, and Parity Bits 3433 through an LDPC encoding operation.

Thereafter, the Shortened Bits 3432 may be removed. That is, Data Bits 3431, Shortened Bits 3432, and Parity Bits 3433 may be changed/converted into Data Bits 3441 and Parity Bits 3442.

Data Bits 3441 and Parity Bits 3442 may be punctured through step (d). Here, some of the Parity Bits 3442 may be punctured. That is, Data Bits 3441 and Parity Bits 3442 may be changed/converted into Data Bits 3451 and Parity Bits 3452.

Through step (e), a portion of the Data Bits 3451 may be copied. Part of the Data Bits 3451 may be Repeat Bits 3463. Data Bits 3451 and Parity Bits 3452 may be changed/converted into Data Bits 3461, Parity Bits 3462, and Repeat Bits 3463. Repeat Bits 3463 may be located after Parity Bits 3462.

(f) For each codeword, processing the data using the number of shortening bits per codeword calculated in step (c), and puncturing or repeating the bits per codeword calculated in steps (d), (e)

(g) Aggregating and parsing all codewords

Accordingly, the transmitting STA may perform LDPC encoding for HARQ based on steps (a) to (g). Thereafter, the transmitting STA may transmit the PPDU to the receiving STA based on the LDPC encoding for HARQ. The receiving STA may perform a check-sum process on CWs in the received PPDU.

Figure 35:
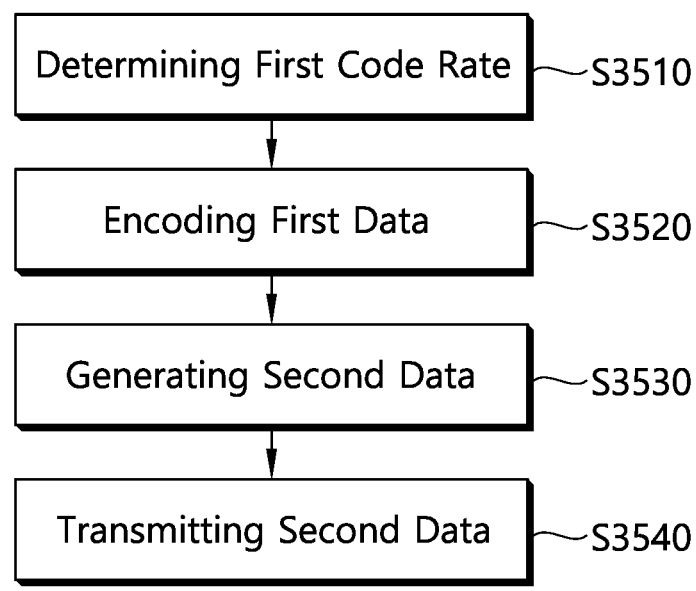
FIG. 35 is a flowchart illustrating an example of an operation of a transmitting STA.

FIG. 35 is a flowchart illustrating an example of an operation of a transmitting STA.

Referring to FIG. 35, in step S3510, a transmitting STA (for example, STAs 110 and 120) may determine a first code rate. For example, the first code rate may be set to one of the values included in the code rate set. That is, the transmitting STA may determine one of the values included in a code rate set as the first code rate.

The code rate set may be set in various ways. For example, the code rate set may include 1/2, 2/3, 3/4, or 5/6. The first code rate may mean a code rate of data to be transmitted.

In step S3520, the transmitting STA may encode the first data based on the second code rate.

According to an embodiment, the second code rate may be set lower than the first code rate. For example, the transmitting STA may set the first code rate to 2/3 and the second code rate to 1/2. For example, the second code rate may be set to one of the values included in the code rate set. That is, the transmitting STA may determine one of the values included in the code rate set as the second code rate.

For another example, the second code rate may be set one step lower than the first code rate. One lower code rate may mean one lower code rate within a code rate set. For example, a code rate one step lower than a code rate of 2/3 may be a code rate of 1/2. As an example, the transmitting STA may set the first code rate to 2/3 and set the second code rate to 1/2.

According to an embodiment, the transmitting STA may always set the second code rate to a specified value (for example, 1/2). For example, the transmitting STA may set the second code rate to the value of the lowest code rate regardless of the first code rate.

According to an embodiment, the transmitting STA may encode the first data based on various encoding schemes. For example, the transmitting STA may encode the first data based on the LDPC encoding scheme. As an example, the transmitting STA may perform LDPC encoding by additionally including shortened bits in the first data. During LDPC encoding, based on that the size of the first data does not match the input size of the LDPC encoder, the transmitting STA may perform LDPC encoding by additionally including shortened bits in the first data. After performing LDPC encoding, the transmitting STA may remove/delete shortened bits.

In step S3530, the transmitting STA may generate a second data based on the first code rate and the encoded first data. For example, the encoded first data may include information bits or parity bits.

According to an embodiment, the transmitting STA may puncture the first portion of the encoded first data based on the first code rate. For example, the transmitting STA may puncture a first portion associated with parity bits of the encoded first data.

According to an embodiment, the transmitting STA may generate the second data based on puncturing the first part of the encoded first data. For example, the code rate of the second data may be set as the first code rate.

In step S3540, the transmitting STA may transmit second data to the receiving STA. According to an embodiment, the transmitting STA may duplicate/copy at least a portion of the second data. The transmitting STA may add at least a part of the duplicated second data to the end of the second data. The transmitting STA may transmit the second data and at least a portion of the duplicated second data to the receiving STA.

According to an embodiment, the transmitting STA may receive a retransmission signal based on the second data. When the second data is not properly received, the receiving STA may transmit a retransmission signal related to the second data. The transmitting STA may receive a retransmission signal related to the second data.

The transmitting STA may puncture the second portion of the encoded first data based on the retransmission signal. For example, the transmitting STA may puncture a second portion related to parity bits of the encoded first data. For another example, the transmitting STA may puncture a second portion related to information bits of the encoded first data. For another example, the transmitting STA may puncture a second portion related to the parity bits or the information bits of the encoded first data.

According to an embodiment, the transmitting STA may differently set the puncturing position of the encoded first data based on the number of transmissions. The transmitting STA may puncture a first portion related to parity bits of the encoded first data, based on the initial transmission. The transmitting STA may puncture a second portion related to information bits or parity bits of the encoded first data based on the retransmission.

The transmitting STA may generate the third data based on puncturing the second portion of the encoded first data. The transmitting STA may transmit the third data to the receiving STA.

The technical features of the present specification described above may be applied to various devices and methods. For example, the above-described technical features of the present specification may be performed/supported through the apparatus of FIGS. 1 and/or 19. For example, the above-described technical features of the present specification may be applied only to a part of FIGS. 1 and/or 19. For example, the technical features of the present specification described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, an apparatus of the present specification may include a processor and a memory coupled to the processor, the processor may be configured to determine a first code rate and encode first data based on a second code rate. The second code rate may be set lower than the first code rate. The processor may be configured to generate second data based on the first code rate and the encoded first data, and transmit the second data to the receiving STA.

The technical features of the present specification may be implemented based on a computer readable medium (CRM). For example, the CRM proposed by the present specification may store instructions for performing operations including: determining a first code rate; encoding first data based on a second code rate, wherein the second code rate is set to be lower than the first code rate; generating second data based on the first code rate and the encoded first data; and transmitting the second data to a receiving STA. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method for a transmitting station (STA) in a wireless local area network system, the method comprising:
    determining a first code rate;
    encoding a first data based on a second code rate, wherein the second code rate is set to be lower than the first code rate, wherein the encoded first data includes information bits and parity bits;
    puncturing a first portion of the parity bits based on the first code rate;
    copying a part of the information bits based on the first code rate;
    generating a second data based on the first code rate and the encoded first data, wherein the second data includes the information bits, the punctured first portion of the parity bits and the part of the copied information bits, wherein a number of bits in the punctured first portion of the parity bits is determined based on the second code rate; and
    transmitting, to a receiving STA, the second data.

2. The method of claim 1, wherein the method further comprises:
    receiving a retransmission signal based on the second data;
    puncturing a second portion of the encoded first data based on the retransmission signal;
    generating a third data based on puncturing the second portion of the encoded first data; and
    transmitting, to the receiving STA, the third data.

3. The method of claim 1, wherein the first code rate and the second code rate are set as one of values included in a code rate set.

4. The method of claim 3, wherein the code rate set includes 1/2, 2/3, 3/4, or 5/6.

5. The method of claim 1, wherein a code rate of the second data is set as the first code rate.

6. A transmitting station (STA) in a wireless local area network (WLAN) system, the transmitting STA comprises,
    a transceiver for transmitting and/or receiving a radio signal; and
    a processor being operably coupled to the transceiver, wherein the processor is configured to:
    determine a first code rate;
    encode a first data based on a second code rate, wherein the second code rate is set to be lower than the first code rate, wherein the encoded first data includes information bits and parity bits;
    puncture a first portion of the parity bits based on the first code rate;
    copy a part of the information bits based on the first code rate;
    generate a second data based on the first code rate and the encoded first data, wherein the second data includes the information bits, the punctured first portion of the parity bits and the part of the copied information bits, wherein a number of bits in the punctured first portion of the parity bits is determined based on the second code rate; and
    transmit, to a receiving STA, the second data.

7. The transmitting STA of claim 6, wherein the processor is configured to:
    receive a retransmission signal based on the second data;
    puncture a second portion of the encoded first data based on the retransmission signal;
    generate a third data based on puncturing the second portion of the encoded first data; and
    transmit, to the receiving STA, the third data.

8. The transmitting STA of claim 6, wherein the first code rate and the second code rate are set as one of values included in a code rate set.

9. The transmitting STA of claim 8, wherein the code rate set includes 1/2, 2/3, 3/4, or 5/6.

10. The transmitting STA of claim 6, wherein a code rate of the second data is set as the first code rate.

11. A device in a wireless local area network (WLAN) system, the device comprises,
    a processor, and
    a memory coupled to the processor, wherein the processor is configured to:
    determine a first code rate;
    encode a first data based on a second code rate, wherein the second code rate is set to be lower than the first code rate, wherein the encoded first data includes information bits and parity bits;
    puncture a first portion of the parity bits based on the first code rate;
    copy a part of the information bits based on the first code rate;
    generate a second data based on the first code rate and the encoded first data, wherein the second data includes the information bits, the punctured first portion of the parity bits and the part of the copied information bits, wherein a number of bits in the punctured first portion of the parity bits is determined based on the second code rate; and
    transmit, to a receiving station (STA), the second data.

* * * * *